(12) United States Patent
Hua et al.

(10) Patent No.: US 10,810,005 B2
(45) Date of Patent: Oct. 20, 2020

(54) APPLICATION GROUP OPERATION METHOD AND TERMINAL

(71) Applicant: Huawei Technologies Co., Ltd., Shenzhen (CN)

(72) Inventors: Xianwen Hua, Shenzhen (CN); Jingqing Mei, Beijing (CN); Guoqing Li, Shenzhen (CN); Xiaona Zhao, Beijing (CN); Xinmiao Chang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 13 days.

(21) Appl. No.: 16/097,164

(22) PCT Filed: Apr. 29, 2016

(86) PCT No.: PCT/CN2016/080738
§ 371 (c)(1),
(2) Date: Oct. 26, 2018

(87) PCT Pub. No.: WO2017/185346
PCT Pub. Date: Nov. 2, 2017

(65) Prior Publication Data
US 2019/0391822 A1    Dec. 26, 2019

(51) Int. Cl.
*G06F 8/70* (2018.01)
*G06F 9/451* (2018.01)
(Continued)

(52) U.S. Cl.
CPC ............ *G06F 8/70* (2013.01); *G06F 3/017* (2013.01); *G06F 3/0488* (2013.01); *G06F 9/44505* (2013.01); *G06F 9/451* (2018.02)

(58) Field of Classification Search
CPC .......... G06F 3/017; G06F 3/0488; G06F 8/70; G06F 9/44505; G06F 9/451
(Continued)

(56) References Cited

U.S. PATENT DOCUMENTS

2011/0314004 A1   12/2011  Mehta
2013/0021381 A1*   1/2013  Zhang .................. G06F 3/0481
                                                          345/661
(Continued)

FOREIGN PATENT DOCUMENTS

CN    102170495 A    8/2011
CN    102214104 A    10/2011
(Continued)

*Primary Examiner* — Qing Chen
(74) *Attorney, Agent, or Firm* — Slater Matsil, LLP

(57) ABSTRACT

An application group operation method and a terminal are disclosed, where the method is applied to a terminal having a display screen, and the method includes receiving a first operation on a first folder in a user interface of the terminal, and obtaining at least one operation option of the first folder, where the at least one operation option is determined based on application configuration files of M APPs in the first folder, and M is an integer greater than 0, and when a first operation option is triggered, executing an operation command corresponding to the first operation option, where the first operation option is one of the at least one operation option.

20 Claims, 8 Drawing Sheets

(51) Int. Cl.
  *G06F 9/445*     (2018.01)
  *G06F 3/0488*   (2013.01)
  *G06F 3/01*      (2006.01)

(58) Field of Classification Search
  USPC .................................. 717/120–123; 715/863
  See application file for complete search history.

(56) References Cited

U.S. PATENT DOCUMENTS

| | | | | |
|---|---|---|---|---|
| 2013/0024794 A1* | 1/2013 | Ha | ...................... | G06F 3/04817 |
| | | | | 715/765 |
| 2013/0120295 A1* | 5/2013 | Kim | .......................... | G06F 3/01 |
| | | | | 345/173 |
| 2013/0219319 A1* | 8/2013 | Park | ...................... | G06F 3/0488 |
| | | | | 715/775 |
| 2013/0226975 A1 | 8/2013 | Lee | | |
| 2014/0101616 A1* | 4/2014 | Kim | ...................... | G06F 3/0488 |
| | | | | 715/846 |
| 2014/0313130 A1* | 10/2014 | Yamano | ................ | G06F 3/0488 |
| | | | | 345/157 |
| 2015/0033184 A1* | 1/2015 | Kim | ...................... | G06F 3/0482 |
| | | | | 715/808 |
| 2016/0062625 A1 | 3/2016 | Mao et al. | | |
| 2016/0277537 A1* | 9/2016 | Liang | ...................... | H04L 67/34 |
| 2016/0313893 A1* | 10/2016 | Xu | ...................... | G06F 3/04845 |
| 2017/0003858 A1* | 1/2017 | Kocharlakota | ..... | G06F 3/04842 |
| 2017/0017355 A1* | 1/2017 | Lim | ...................... | G06F 3/0482 |
| 2017/0126650 A1* | 5/2017 | Hay | ...................... | G06F 16/285 |

FOREIGN PATENT DOCUMENTS

| | | |
|---|---|---|
| CN | 103257792 A | 8/2013 |
| CN | 103324389 A | 9/2013 |
| CN | 103699300 A | 4/2014 |
| CN | 104090703 A | 10/2014 |
| CN | 104951366 A | 9/2015 |
| CN | 105282126 A | 1/2016 |

\* cited by examiner

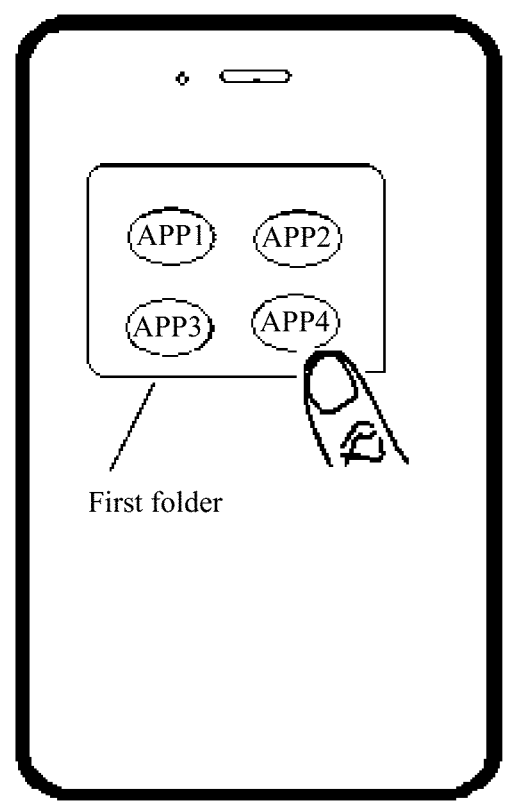
FIG. 3-a

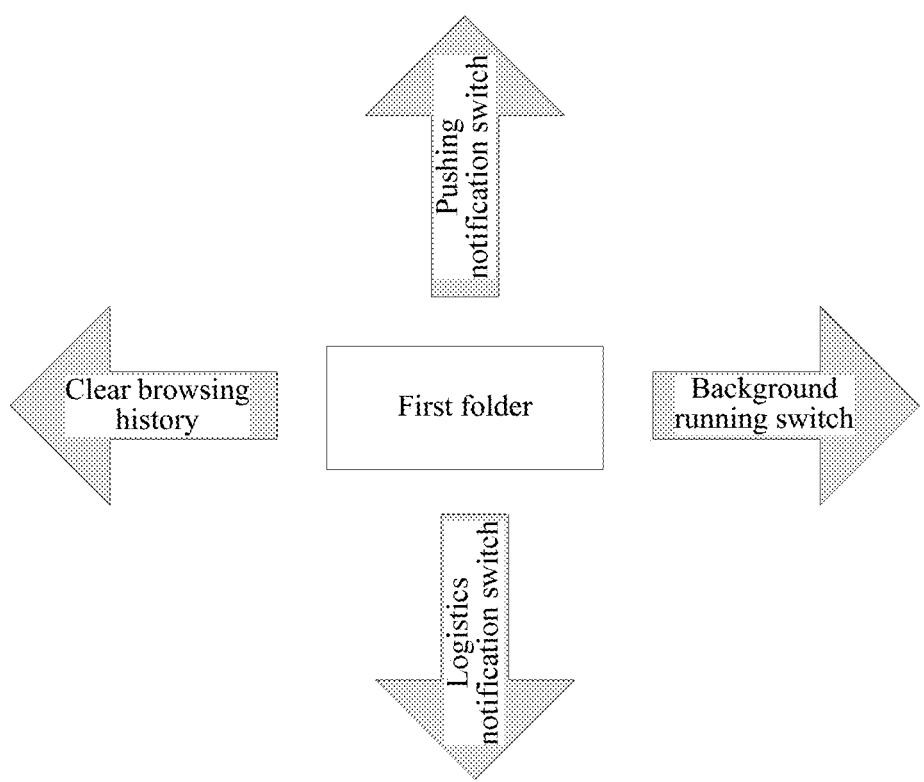
FIG. 3-b

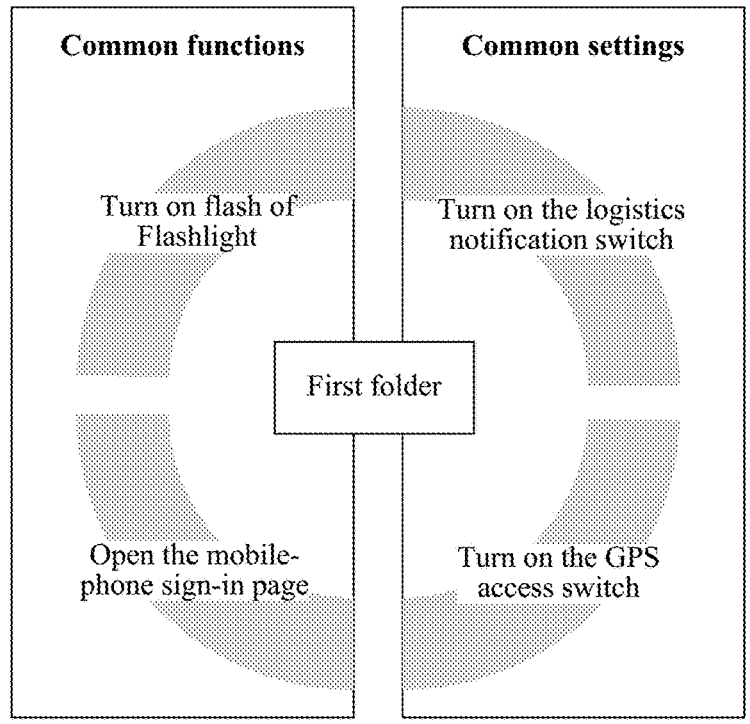
FIG. 3-c
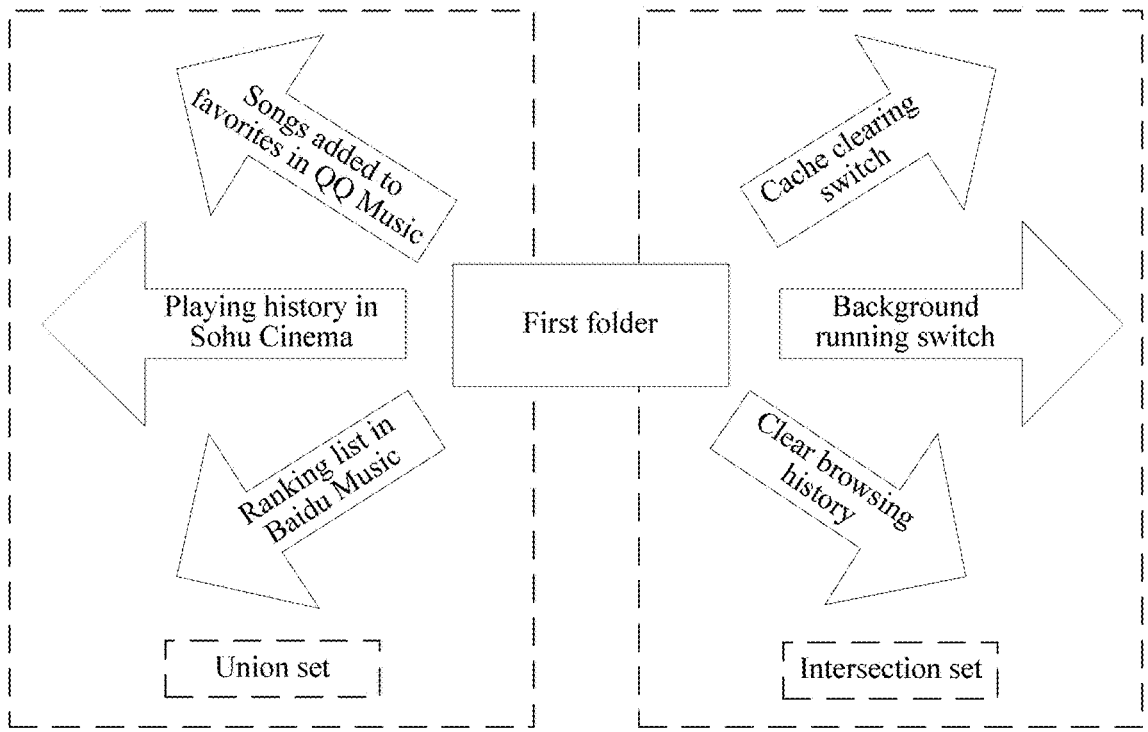
FIG. 3-d

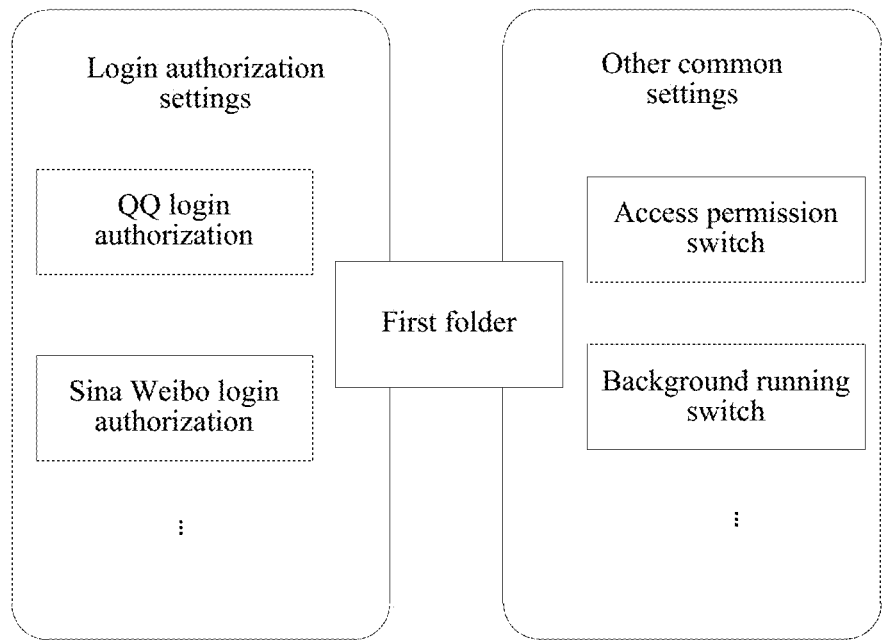
FIG. 3-e
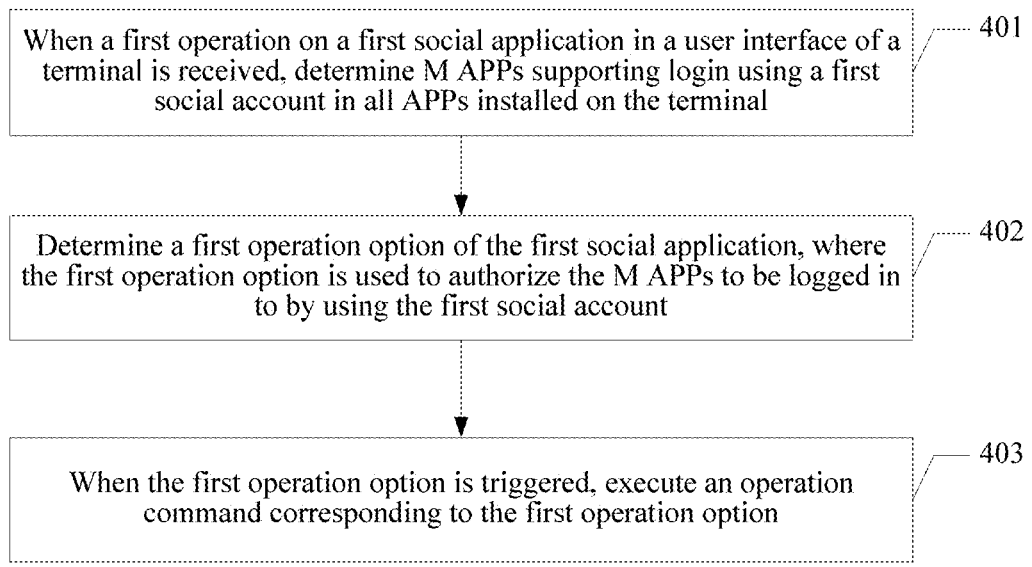
FIG. 4

APPLICATION GROUP OPERATION METHOD AND TERMINAL

CROSS-REFERENCE TO RELATED APPLICATIONS

This application is a National Stage of International Application No. PCT/CN2016/080738, filed on Apr. 29, 2016, which is hereby incorporated by reference in its entirety.

TECHNICAL FIELD

The present invention relates to the terminal field, and specifically, to an application operation method and a terminal.

BACKGROUND

Currently, to efficiently manage applications (APP) on a smart terminal (for example, a mobile phone or a tablet), a user generally categorizes the APPs into corresponding folders based on criteria such as attributes or functions of the APPs or personal preferences.

When there is a need to manage similar functions or characteristics of a plurality of APPs in the folder, the user needs to enter the folder and open all the APPs in sequence, and perform a corresponding operation in a user interface (UI) provided by each APP, or enter a user interface from an entry provided by a system, and perform a corresponding operation on each APP, and the like. For example, a folder on the smart terminal includes a plurality of social APPs such as WeChat, QQ, Sina Weibo, and Facebook. If the user wants to set functions (for example, a new message alert sound or a Do Not Disturb mode) of these social APPs, the user needs to set these APPs separately. For example, the user opens WeChat first, and sets some functions (for example, sets the new message alert sound to vibration and turns off the Do Not Disturb mode) after entering a user interface from a setting option of WeChat, and then operates QQ, Sina Weibo, Facebook, and the like in sequence to complete settings on functions similar to the functions of WeChat. If the user wants to manage access permissions (for example, reading contacts, reading location information, reading a local identification code, and invoking a camera) of these social APPs, using an Android system as an example, the user may open system settings via a desktop icon, and then set the applications one by one after entering a user interface from a permission management option. To be specific, the user searches a menu and chooses WeChat, and then manages these permissions (for example, sets these permissions to forbidding reading contacts, permitting reading location information, forbidding reading a local identification code, and permitting invoking a camera). Then the user performs similar operations on QQ, Sina Weibo, and the like in sequence to complete permission management.

It can be learned that when similar functions or characteristics of a plurality of APPs in a folder are managed in the prior art, operation steps are tedious and user experience is poor.

SUMMARY

An objective of the present invention is to provide an application group operation method and a terminal, to resolve a problem that a plurality of APPs in a folder cannot be managed together in the prior art. Operation steps are simple and user experience is effectively improved.

A first aspect provides an application APP group operation method. The method is applied to a terminal having a display screen, and the method includes: receiving a first operation on a first folder in a user interface of the terminal, and obtaining at least one operation option of the first folder, where the at least one operation option is determined based on application configuration files of M APPs in the first folder, and M is an integer greater than 0, and when a first operation option is triggered, executing an operation command corresponding to the first operation option, where the first operation option is one of the at least one operation option.

It can be learned that the terminal receives the first operation on the first folder in the user interface of the terminal, and the terminal obtains the at least one operation option of the first folder. The at least one operation option is determined based on the application configuration files of the M APPs in the first folder, and M is an integer greater than 0. The application configuration files include information describing common functions and/or common settings of the APPs. The common settings include a service parameter setting, a system permission management setting, and the like of the APPs, for example, reading or modifying contacts, reading location information, invoking a camera, and other access permission settings, a message notification setting, a login authorization setting, a privacy setting, a font size setting, and a language setting. The common functions include service capabilities of the APPs, that is, some commonly used functions of the APPs. For example, Baidu Maps and Gaode Maps have a positioning and navigation function, WeChat and QQ have an alert sound setting function, Flashlight has a flash function, an application of an enterprise has a sign-in attendance function, Radio FM has a broadcast receiving function, KuGou has a music playing function, Jinri Toutiao and Tencent News have a news pushing function, and Alipay and WeChat have a payment function. The terminal determines the at least one operation option of the first folder based on the application configuration files of the M APPs. The at least one operation option is determined by obtaining an intersection set or a union set of the common settings and/or the common functions in the M application configuration files, and then may be presented in a specific form (for example, a menu, a categorization arrow, or different color zones) on the UI for a user to choose. For example, the at least one operation option is one or more operation options corresponding to access permission management, an operation option corresponding to notification management, an operation option corresponding to login authorization, an operation option corresponding to an alert sound setting, an operation option corresponding to flash of Flashlight, or an operation option corresponding to listening to the radio or music. When detecting that the first operation option is triggered, the terminal executes the operation command corresponding to the first operation option. For example, after detecting that the user chooses the operation option corresponding to access permission management, the terminal displays an access permission management interface for the user to manage at least one access permission, to execute a corresponding operation command, for example, forbidding reading or modifying contacts, forbidding reading location information, or permitting invoking a camera. Alternatively, after detecting that the user directly chooses, on the UI, an operation option (for example, forbidding reading or modifying contacts) corresponding to management on a specific access permission, the terminal directly executes a corresponding operation command (that is, forbidding these APPs in the folder to read or modify contact information on the terminal), after detecting that the user chooses the operation option corresponding to flash of Flashlight, the terminal directly executes a corresponding operation command, that is, turns on the flash function of Flashlight, after detecting the operation option corresponding to login authorization (for example, login authorization using a QQ account), the terminal directly executes a corresponding operation command, for example, performs, by using a QQ account (which may be an account that has been used to log in to QQ software on the terminal, or may be an account that is instantly entered by the user), login authorization on all APPs in the folder that support a QQ account login manner and are in a logout state. It can be learned that similar functions or characteristics of the M APPs in the first folder are managed together, operation steps are simplified, and user experience is effectively improved.

With reference to the first aspect, in some possible implementations, the first operation includes touching and holding, force touch, or rotation, and the touching and holding, the force touch, and the rotation are all used to trigger an intersection set and/or a union set of the application configuration files of the M APPs to be obtained.

In some possible implementations, the touching and holding is pressing the display screen for a pressing time within a first time range or a second time range, where touching and holding within the first time range is used to trigger the intersection set of the application configuration files of the M APPs to be obtained, and touching and holding within the second time range is used to trigger the union set of the application configuration files of the M APPs to be obtained, the force touch is pressing the display screen with a pressing force magnitude within a first force magnitude range or a second force magnitude range, where force touch within the first force magnitude range is used to trigger the intersection set of the application configuration files of the M APPs to be obtained, and force touch within the second force magnitude range is used to trigger the union set of the application configuration files of the M APPs to be obtained, and the rotation is clockwise rotation or counterclockwise rotation on the display screen, where the clockwise rotation is used to trigger the intersection set of the application configuration files of the M APPs to be obtained, and the counterclockwise rotation is used to trigger the union set of the application configuration files of the M APPs to be obtained, or the rotation is rotation on the display screen from a basis point at a rotation angle within a first angle range or a second angle range, where rotation within the first angle range is used to trigger the intersection set of the application configuration files of the M APPs to be obtained, and rotation within the second angle range is used to trigger the union set of the application configuration files of the M APPs to be obtained.

In some other possible implementations, the touching and holding is pressing the display screen for a pressing time within a third time range, where touching and holding within the third time range is used to trigger the intersection set and the union set of the application configuration files of the M APPs to be obtained, the force touch is pressing the display screen with a pressing force magnitude within a third force magnitude range, where force touch within the third force magnitude range is used to trigger the intersection set and the union set of the application configuration files of the M APPs to be obtained, and the rotation is clockwise rotation or counterclockwise rotation on the display screen, where the clockwise rotation is used to trigger the intersection set and the union set of the application configuration files of the M APPs to be obtained, or the counterclockwise rotation is used to trigger the intersection set and the union set of the application configuration files of the M APPs to be obtained, or the rotation is rotation on the display screen from a basis point at a rotation angle within a third angle range, where rotation within the third angle range is used to trigger the intersection set and the union set of the application configuration files of the M APPs to be obtained.

It can be learned that the terminal may preset a length of time for touching and holding, a force magnitude for force touch, or a manner for rotation (which is usually set on the terminal before delivery, and certainly does not exclude being autonomously set by the user based on a preference). It is assumed that the first time range is T1 to T1+ΔT1, the second time range is T2 to T2+ΔT2, and the third time range is T3 to T3+ΔT3. T1, T2, and T3 each represent a start time, ΔT1, ΔT2, and ΔT3 each represent a time variation, T1, T2, and T3 each are a number greater than or equal to 0, ΔT1, ΔT2, and ΔT3 each are a number greater than 0, and values of T1, T2, and T3 are not fixed. For example, T1 may be greater than or less than or equal to T2. During actual application, it is feasible to implement only a touching and holding operation within the first time range, or implement only a touching and holding operation within the second time range, or implement only a touching and holding operation within the third time range. In this case, the first time range, the second time range, and the third time may be consecutive. For example, the first time range is 0 to 30 ms, the second time range is 30 ms to 60 ms, and the third time range is at least 60 ms. Certainly, they may alternatively be inconsecutive. For example, the first time range is 0 to 30 ms, the second time range is 40 ms to 60 ms, and the third time range is at least 70 ms. Similarly, for the first force magnitude range, the second force magnitude range, and the third force magnitude range, and for the first angle range, the second angle range, and the third angle range, a definition or setting method similar to that used for the first time range, the second time range, and the third time range is used, and details are not described herein again.

When the user performs a touching and holding, force touch, or rotation operation on the first folder (any folder on the terminal) on the UI of the terminal according to the foregoing requirement (for example, the user performs a touch operation such as the touching and holding, the force touch, or the rotation on an icon or an area corresponding to the first folder on the UI), the terminal may be triggered to perform corresponding calculation on the application configuration files of the M APPs in the first folder, that is, obtain the union set and/or the intersection set of the application configuration files of the M APPs. Based on the foregoing example, for example, when duration when the user touches and holds the first folder on the display screen of the terminal ranges from T1 to T1+ΔT1, the intersection set of the application configuration files of the M APPs is triggered to be obtained, or when duration when the user touches and holds the first folder on the display screen of the terminal ranges to T2+ΔT2, the union set of the application configuration files of the M APPs is triggered to be obtained, or when duration when the user touches and holds the first folder on the display screen of the terminal ranges to T3+ΔT3, the intersection set and the union set of the application configuration files of the M APPs is triggered to be obtained. For another example, when duration when the user touches and holds the first folder on the display screen of the terminal ranges from T1 to T1+ΔT1, the intersection set of the application configuration files of the M APPs is triggered to be obtained, then when the user continues touching and holding so that the duration ranges from T2 to T2+ΔT2, the union set of the application configuration files of the M APPs is triggered to be obtained, and then when the user continues touching and holding so that the duration ranges from T3 to T3+ΔT3, the intersection set and the union set of the application configuration files of the M APPs is triggered to be obtained. Implementation of the force touch or rotation operation is not illustrated herein again. It can be learned that the first operation on the first folder in the user interface of the terminal is used to trigger corresponding calculation on the application configuration files of the M APPs in the first folder, to present different operation options for the user to choose. The user can manage similar functions or characteristics of a plurality of APPs in the folder together by using a lightweight UI, operation complexity is reduced, and user experience is effectively improved.

It can be learned that it is determined, based on the first operation on the first folder, to obtain the intersection set and/or the union set of the application configuration files (including the common functions and/or the common settings of the APPs) of the M APPs in the first folder, to determine the at least one operation option (that is, a corresponding operation option obtained after the intersection set or the union set of the common functions and/or the common settings of the APPs is obtained) of the first folder. During actual application, an operation option determined by obtaining the intersection set of the application configuration files of the M APPs in the first folder is used to trigger a corresponding operation command to be executed on each APP in the first folder by using the first folder. For example, it is assumed that the first folder includes five APPs: WeChat, QQ, Sina Weibo, Jinri Toutiao, and KuGou, and application configuration files of the five APPs include at least description information about a new message alert sound setting. If the user wants to set new message alert sounds of the five APPs, based on the foregoing example, assuming that duration when the user touches and holds the first folder on the display screen of the terminal ranges from T1 to T1+ΔT1, an intersection set of the application configuration files of the five APPs is triggered to be obtained, at least one operation option for the user to choose is determined by obtaining the intersection set of the application configuration files of these APPs, and the at least one operation option is displayed in the user interface by using a geometric shape or a menu bar, so that the user chooses an operation option corresponding to the new message alert sounds. Further, the terminal sets the new message alert sounds of the five APPs together by using the first folder, for example, sets the new message alert sounds to silent, or to a specific tone. An operation option determined by obtaining the union set of the application configuration files of the M APPs in the first folder is used to trigger a corresponding operation command to be executed on at least one APP in the first folder by using the first folder. For another example, based on the foregoing example, it is assumed that duration when the user touches and holds the first folder on the display screen of the terminal ranges from T2 to T2+ΔT2, a union set of the application configuration files of the five APPs is triggered to be obtained. It is assumed that application configuration files of WeChat, QQ, Sina Weibo, and Jinri Toutiao each include at least description information about a message pushing switch setting, and an application configuration file of KuGou includes description information about playing music. Then at least one operation option for the user to choose is determined by obtaining the union set of the application configuration files of these APPs. If the user chooses an operation option corresponding to a message pushing switch, the terminal directly sets message pushing switches of WeChat, QQ, Sina Weibo, and Jinri Toutiao (for example, turns off the message pushing switches) together. If the user chooses an operation option corresponding to playing music, the terminal directly opens KuGou to play music. For another example, based on the foregoing example, it is assumed that duration when the user touches and holds the first folder on the display screen of the terminal ranges from T3 to T3+ΔT3, the intersection set and the union set of the application configuration files of the five APPs are triggered to be obtained. For example, the intersection set and the union set of the application configuration files of the five APPs are synchronously or asynchronously obtained. Details are not described herein. In this way, similar functions or characteristics of at least one APP in the first folder are managed together, operations are simple, and user experience is effectively improved.

In some other possible implementations, before the receiving a first operation on a first folder in a user interface of the terminal, the method further includes: determining the at least one operation option of the first folder.

In some other possible implementations, the determining the at least one operation option of the first folder includes: determining the at least one operation option of the first folder by obtaining an intersection set and/or a union set of the application configuration files of the M APPs, where an operation option determined by obtaining the intersection set is used to trigger an operation command to be executed on the M APPs, and an operation option determined by obtaining the union set is used to trigger an operation command to be executed on at least one of the M APPs.

To be specific, after the M APPs are put into the folder, the terminal may determine, at any time before the first operation on the first folder is received, an operation option corresponding to the intersection set and/or the union set of the application configuration files of the M APPs. In this way, when the first operation on the first folder is received, the at least one operation option of the first folder may be directly obtained, thereby increasing a running speed of the terminal.

In some other possible implementations, after the obtaining at least one operation option of the first folder, the method further includes: displaying the at least one operation option in the user interface of the terminal by using a geometric shape or a menu bar.

It can be learned that the at least one operation option is displayed in the user interface of the terminal by using the geometric shape (for example, a sector, a rectangle, an ellipse, or an arrow, which is not specifically limited herein) or the menu bar for the user to choose. Each geometric-shape area corresponds to one operation option or one type of operation option, or each operation option is displayed in the menu bar in a user-defined or terminal-default order. Each geometric-shape area may be further distinguished by using a color, an orientation, or a text description. For example, any geometric shapes in different colors each correspond to one or one type of operation option, or any geometric shapes in different orientations each correspond to one or one type of operation option, or any geometric shapes with different text descriptions each correspond to one or one type of operation option. All the geometric shapes may be the same (for example, four or four types of operation options are displayed by using four identically shaped sectors in different colors), or be different (for example, four or four types of operation options are displayed by using four different geometric shapes). During actual application, if operation options cannot be all displayed on one display screen, some operation options may be triggered to be displayed on a next display screen by dragging, sliding, or other gesture operations, for example, dragging an icon of the first folder for clockwise or counterclockwise rotation to perform a screen switching operation for operation options, or the icon of the first folder may be dragged for horizontal or vertical movement to perform screen switching for operation options. This is not specifically limited herein. Sorting (for example, vertical sorting, horizontal sorting, or clockwise or counterclockwise sorting) of the operation options in the user interface may be defined by the user, or may be determined by the terminal according to a specific rule (for example, by default or based on a use frequency or a name). It can be learned that the at least one operation option is displayed in the user interface of the terminal by using the geometric shape or the menu bar through specific sorting, visual experience of the user is improved, interaction between the terminal and the user is enhanced, and user experience is effectively improved.

In some other possible implementations, the displaying the at least one operation option in the user interface of the terminal by using a geometric shape or a menu bar includes: when the at least one operation option of the first folder is determined by obtaining the union set of the application configuration files of the M APPs, prioritizing, based on a use frequency or a use permission, the at least one operation option determined by obtaining the union set, and displaying some operation options having a high priority in the user interface of the terminal by using the geometric shape or the menu bar.

During actual application, when the at least one operation option of the first folder is determined by obtaining the union set of the application configuration files of the M APPs, an excessive quantity of operation options may be obtained, resulting in miscellaneous content when all the operation options are displayed in the user interface, making it inconvenient for the user to choose a corresponding operation option. For example, the operation options cannot be all displayed on one user interface but are displayed by using a plurality of user interfaces. In this case, the user needs to switch between user interfaces through sliding or dragging, to choose a corresponding operation option. User experience is relatively poor. Therefore, the at least one operation option determined by obtaining the union set may be prioritized based on the use frequency or the use permission (for example, a limitation scope of an application scenario corresponding to the operation option), and then some operation options having a high priority are displayed in the user interface of the terminal by using the geometric shape or the menu bar. For example, some operation options have a high use frequency, some operation options have a low use frequency, and the operation options having the high use frequency are preferentially displayed in the user interface. Alternatively, some operation options are limited in some application scenarios, some operation options are not limited in application scenarios, and operation options having a high use permission are preferentially displayed in the user interface. A specific display manner is described above, and details are not described herein again. It should be noted that in addition to prioritizing the operation options based on the use frequency or the use permission, the operation options may alternatively be sorted in one or more manners such as a user-defined manner or a terminal-default manner. This is not specifically limited herein.

In some other possible implementations, when the application configuration files of the M APPs include information indicating that login using at least one social account is supported, and the M APPs are in a logout state, the executing an operation command corresponding to the first operation option includes: when the first operation option is an operation option determined by obtaining the intersection set based on the information of the M APPs that indicates that login using the at least one social account is supported, authorizing the M APPs to be logged in to by using a first social account, where the first social account is one of the at least one social account, or when the first operation option is an operation option determined by obtaining the union set based on the information of the M APPs that indicates that login using the at least one social account is supported, authorizing at least one of the M APPs to be logged in to by using a second social account, where the second social account is one of the at least one social account.

In some other possible implementations, when the application configuration files of the M APPs include the information indicating that login using the at least one social account is supported, and the M APPs are in a login state, the executing an operation command corresponding to the first operation option includes: when the first operation option is the operation option determined by obtaining the intersection set based on the information of the M APPs that indicates that login using the at least one social account is supported, and the M APPs include an APP that has been logged in to by using a non-third social account, authorizing the APP that has been logged in to by using the non-third social account to switch to login using a third social account, where the third social account is one of the at least one social account, or when the first operation option is the operation option determined by obtaining the union set based on the information of the M APPs that indicates that login using the at least one social account is supported, and the M APPs include APPs that have been logged in to by using a non-fourth social account, authorizing at least one of the APPs that have been logged in to by using the non-fourth social account to switch to login using a fourth social account, where the fourth social account is one of the at least one social account.

The information indicating that login using the at least one social account is supported is configured in the application configuration files of the M APPs when the M APPs are installed on the terminal.

It can be learned that description information indicating that the M APPs support login using the at least one social account is obtained based on the application configuration files of the M APPs, an intersection set or a union set of the M pieces of description information is obtained to determine the at least one operation option of the first folder, and login authorization on the at least one APP in the first folder is triggered by using the at least one operation option instead of opening the first folder and choosing an authorization manner for each APP in the first folder one by one. User experience is effectively improved. For example, the first folder includes a plurality of APPs such as a first music application (for example, KuGou Music), a first video application (for example, Youku), and a first singing application (for example, Changba). After detecting that the user performs the first operation on the first folder, the terminal obtains application configuration files of these APPs. If a configuration file of each APP includes description information indicating that login using a social account is supported, assuming that the first music application supports a login authorization manner using a QQ account or a Sina Weibo account, the first video application supports a login manner using a QQ account or a WeChat account, and the first singing application supports a login manner using a QQ account, a Facebook account, or a Twitter account, an intersection set or a union set of the description information about these APPs is obtained to determine the at least one operation option of the first folder. For example, after the intersection set is obtained, it is determined that the first operation option is authorizing all the APPs in the folder to be logged in to by using a QQ account. For another example, after the union set is obtained, it is determined that the first operation option is authorizing all the APPs to be logged in to by using a QQ account, the second operation option is authorizing the first music application and the first video application to be logged in to by using a Sina Weibo account, the third operation option is authorizing the first video application to be logged in to by using a WeChat account, and the fourth operation option is authorizing the first singing application to be logged in to by using a Facebook account or a Twitter account. Then the at least one operation option is used to trigger login authorization on at least one of these APPs. For example, using obtaining of the intersection set as an example, after detecting that the user chooses the first operation option, the terminal authorizes, automatically in the background, these APPs to be logged in to by using an account that has been used to log in to the QQ application on the terminal, or displays QQ account number and login password input boxes in the user interface for the user to enter an account number and a password and log in to these APPs. Other examples are not enumerated herein one by one.

Assuming that the first folder includes an APP in the login state, for example, the first music application has been logged in to by using a Sina Weibo account, using obtaining of the intersection set as an example, if it is determined that the first operation option is authorizing all the APPs to be logged in to by using a QQ account, after detecting that the user chooses the first operation option, when authorizing these APPs to be logged in to by using a QQ account, the terminal notifies the user that the first music application has been logged in to or has been logged in to by using the Sina Weibo account, and queries the user whether to switch to login using a QQ account. If the user chooses yes, the first music application is switched to login using a QQ account. Otherwise, no switching is performed, that is, an original login manner is retained. When determining the first operation option, the terminal notifies the user that the first music application has been logged in to or has been logged in to by using the Sina Weibo account, and queries the user whether to switch to login using a QQ account. If the user chooses yes, it is determined that the first operation option is authorizing all the APPs to be logged in to by using a QQ account. Otherwise, it is determined that the first operation option is authorizing the first video application and the first singing application to be logged in to by using a QQ account, to perform a corresponding login authorization operation after the user chooses the first operation option. Other examples are not enumerated herein one by one.

A second aspect provides an application APP operation method. The method is applied to a terminal having a display screen, and the method includes: when a first operation on a first social application in a user interface of the terminal is received, determining M APPs supporting login using a first social account in all APPs installed on the terminal, where M is an integer greater than 0, and the first social account is a login account corresponding to the first social application, determining a first operation option of the first social application, where the first operation option is used to trigger the M APPs to be logged in to by using the first social account, and when the first operation option is triggered, executing an operation command corresponding to the first operation option.

During actual application, when a user performs the first operation on the first social application in the user interface of the terminal, the terminal obtains information about application configuration files of all the APPs installed on the terminal or all APPs in a logout state, to check whether these configuration files include description information indicating that login authorization using the first social account is supported. If these configuration files include the description information, the terminal determines that the first operation option is authorizing corresponding APPs to be logged in to by using the first social account, so that after the user chooses the first operation, these APPs are logged in to together by using the first social account. For example, it is assumed that the first social application is a QQ application, and application configuration files of APPs: a first music application (for example, KuGou Music), a first video application (for example, Youku), a first news application (for example, Jinri Toutiao), a first fitness application (for example, Codoon Sports), and a first game application (for example, Kupao) on the terminal all include description information indicating that login authorization using a QQ account is supported. Then it is determined that the first operation option is authorizing these APPs to be logged in to by using a QQ account. After the user chooses the first operation option, these APPs are authorized to be logged in to together by using a QQ account. It can be learned that the first operation option of the first social application is used for login authorization on the M APPs on the terminal, it is unnecessary to choose an authorization manner for each APP one by one, and instead, login authorization management is directly performed together based in the user interface. User experience is effectively improved.

With reference to the second aspect, in some possible implementations, the first operation includes touching and holding, force touch, or rotation, where the touching and holding is pressing the display screen for a pressing time within a first time range, where touching and holding within the first time range is used to trigger the terminal to determine the APPs supporting login using the first social account, the force touch is pressing the display screen with a pressing force magnitude within a first force magnitude range, where force touch within the first force magnitude range is used to trigger the terminal to determine the APPs supporting login using the first social account, and the rotation is clockwise rotation or counterclockwise rotation on the display screen, where the clockwise rotation or the counterclockwise rotation is used to trigger the terminal to determine the APPs supporting login using the first social account, or the rotation is rotation on the display screen from a basis point at a rotation angle within a first angle range, where rotation within the first angle range is used to trigger the terminal to determine the APPs supporting login using the first social account.

It can be learned that the terminal may preset a length of time for touching and holding, a force magnitude for force touch, or a manner for rotation (which is usually set on the terminal before delivery, and certainly does not exclude being autonomously set by the user based on a preference). It is assumed that the first time range is T1 to T1+ΔT1. T1 represents a start time, ΔT1 represents a time variation, T1 is a number greater than or equal to 0, and ΔT1 is a number greater than 0. For example, the first time range is 0 to 30 ms. Similarly, for the first force magnitude range and for the first angle range, a definition or setting method similar to that used for the first time range is used, and details are not described herein again.

When the user performs, on the first social application on the UI of the terminal in the foregoing manner, the first operation corresponding to the touching and holding, the force touch, or the rotation, the terminal is triggered to determine the APPs supporting login using the first social account. For example, assuming that the first social application is the QQ application, when duration when the user touches and holds an icon or an area corresponding to the QQ application on the display screen of the terminal ranges from T1 to T1+ΔT1, the terminal is triggered to determine APPs supporting login using a QQ account.

In some possible implementations, the determining M APPs supporting login using a first social account in all APPs installed on the terminal includes: obtaining application configuration files of all the APPs installed on the terminal, where application configuration files of the M APPs include at least information indicating that login using the first social account is supported, and determining, based on the information of all the APPs that indicates that login using the first social account is supported, the M APPs supporting login using the first social account.

During actual application, it is assumed that the first social application is the QQ application, and the application configuration files of the APPs: the first music application (for example, KuGou Music), the first video application (for example, Youku), the first news application (for example, Jinri Toutiao), the first fitness application (for example, Codoon Sports), and the first game application (for example, Kupao) on the terminal all include the description information indicating that login authorization using a QQ account is supported. Then it is determined that these APPs support login using a QQ account, that is, support a QQ account login authorization manner.

In some other possible implementations, when the M APPs include an APP in a logout state, the executing an operation command corresponding to the first operation option includes: authorizing the APP in the logout state to be logged in to by using the first social account, and when the M APPs include an APP that is in a login state and is logged in to by using a non-first social account, the executing an operation command corresponding to the first operation option includes: authorizing the APP that is in the login state and is logged in to by using the non-first social account to switch to login using the first social account.

During actual application, it is assumed that the first social application is the QQ application, a plurality of APPs such as the first music application (for example, KuGou Music), the first video application (for example, Youku), and the first singing application (for example, Changba) that support login using a QQ account are installed on the terminal, and these APPs are all in the logout state. If it is determined that the first operation option is authorizing these APPs to be logged in to by using a QQ account, after detecting that the user chooses the first operation option, the terminal may directly authorize these APPs to be logged in to by using a QQ account, or when authorizing these APPs to be logged in to by using a QQ account, queries the user whether to use a QQ account for login, and if the user chooses yes, authorizes these APPs to be logged in to by using a QQ account. Assuming that these APPs include an APP in the login state, for example, the first music application has been logged in to by using a Sina Weibo account, if it is determined that the first operation option is authorizing these APPs to be logged in to by using a QQ account, after detecting that the user chooses the first operation option, when authorizing these APPs to be logged in to by using a QQ account, the terminal may further notify the user that the first music application has been logged in to or has been logged in to by using the Sina Weibo account, and query the user whether to switch to login using a QQ account. If the user chooses yes, the first music application is switched to login using a QQ account. Otherwise, no switching is performed, that is, an original login manner is retained. Other examples are not enumerated herein one by one.

It can be learned that the first operation option of the first social application is used to authorize, when the M APPs include the APP in the logout state, the APP in the logout state to be logged in to by using the first social account, and authorize, when the M APPs include the APP that is in the login state and is logged in to by using the non-first social account, the APP that is in the login state and is logged in to by using the non-first social account to switch to login using the first social account. Switching is flexible, and user experience is effectively improved.

A third aspect of the present invention provides a terminal. The terminal is provided with functions for implementing the method provided in the first aspect or any optional implementation of the first aspect or the second aspect or any optional implementation of second aspect, and is implemented by hardware/software, and the hardware/software includes units corresponding to the functions.

BRIEF DESCRIPTION OF THE DRAWINGS

FIG. 3-*a* is a schematic diagram of an application scenario of an application group operation method according to an embodiment of the present invention;

FIG. 3-*b* is a schematic diagram of another application scenario of an application group operation method according to an embodiment of the present invention;

FIG. 3-*c* is a schematic diagram of another application scenario of an application group operation method according to an embodiment of the present invention;

FIG. 3-*d* is a schematic diagram of another application scenario of an application group operation method according to an embodiment of the present invention;

FIG. 3-*e* is a schematic diagram of another application scenario of an application group operation method according to an embodiment of the present invention;

FIG. 4 is a schematic diagram of an embodiment of an application operation method according to an embodiment of the present invention;

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 1:
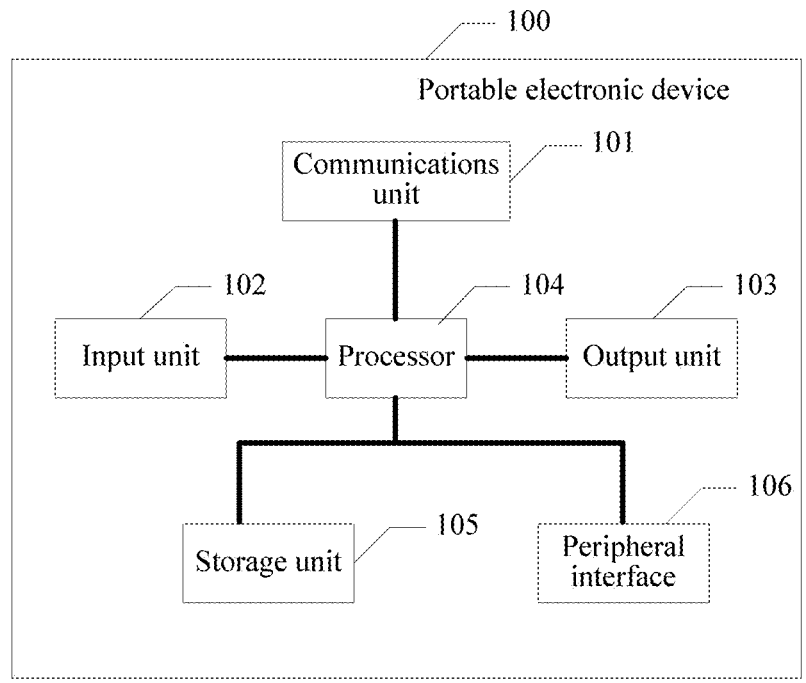
FIG. 1 is a schematic structural diagram of a terminal according to an embodiment of the present invention.

The technical solutions of the present invention are applied to a terminal. As shown in FIG. 1, the terminal 100 includes a communications unit 101, an input unit 102, an output unit 103, a processor 104, a storage unit 105, and a peripheral interface 106, and the units are connected by using one or more buses.

Specifically, the communications unit 101 is configured to establish a communications channel, so that the terminal is connected to a remote server through the communications channel, and downloads media data from the remote server. The communications unit may include a communications module such as a wireless local area network (wireless LAN) module, a Bluetooth module, an NFC module, or a baseband module and a radio frequency (RF) circuit corresponding to the communications module, and is configured to perform wireless local area network communication, Bluetooth communication, near field communications (NFC) communication, infrared communication, and/or communication based on a cellular communications system, for example, Wideband Code Division Multiple Access (W-CDMA) and/or High Speed Downlink Packet Access (HSDPA). The communications module is configured to control communication of components in the terminal, and can support direct memory access (DMA).

The input unit 102 is configured to receive and send signals in an information receiving and sending process or during a call. For example, after downlink information of a base station is received, the downlink information is sent to the processing unit 104 for processing, in addition, designed uplink data is sent to the base station. For example, after information sent by an external device is received, the information is sent to the processing unit 104 for processing, and a processing result is sent to the external device. Generally, the input unit 102 includes a known circuit for performing these functions, including but not limited to an antenna system, a radio frequency transceiver, one or more amplifiers, a tuner, one or more oscillators, a digital signal processor, a codec (Codec) chip set, a subscriber identity module (SIM) card, a memory, and the like. In addition, the input unit 102 may further communicate with a network and another device through wireless communication. The wireless communication may use any communication standard or protocol, including but not limited to a Global System for Mobile Communications (GSM), a general packet radio service (GPRS), Code Division Multiple Access (CDMA), Wideband Code Division Multiple Access (WCDMA), a High Speed Uplink Packet Access (HSUPA) technology, Long Term Evolution (LTE), an email, a short message service (SMS), and the like.

The output unit 103 includes, but is not limited to, an image output unit and an audio output unit. The image output unit is configured to output a text, a picture, and/or a video. The image output unit may include a display panel, for example, a display panel configured in a form of a liquid crystal display (LCD), an organic light-emitting diode (OLED), a field emission display (FED), or the like. Alternatively, the image output unit may include a reflective display, for example, an electrophoretic display, or a display using a technology of interferometric modulation of light. The image output unit may include a single display or a plurality of displays of different sizes. In a specific implementation of the present invention, a touch panel used by the input unit 102 may also be used as the display panel of the output unit 103. For example, after detecting touch on the touch panel or a gesture operation near the touch panel, the touch panel transfers the touch or gesture operation to the processing unit to determine a type of a touch event, and subsequently, the processing unit provides corresponding visual output on the display panel based on the type of the touch event. Although in FIG. 1, the input unit 102 and the output unit 103 serve as two independent parts to implement input and output functions of the terminal, in some embodiments, the touch panel and the display panel may be integrated to implement the input and output functions of the terminal. For example, the image output unit may display various graphical user interfaces (GUI) as virtual control components, including but not limited to a window, a scroll bar, an icon, and a clipboard, so that the user performs operations in a touch manner. In a specific implementation of the present invention, the image output unit includes a filter and an amplifier, to filter and amplify a video output by the processing unit 104. The audio output unit includes a digital-to-analog converter, to convert, from a digital format to an analog format, an audio signal output by the processing unit 104.

The storage unit 105 may be configured to store a software program and module. The processing unit 104 performs various functional applications of the terminal and implements data processing by running the software program and module stored in the storage unit. The storage unit mainly includes a program storage area and a data storage area. The program storage area may store an operating system, and an application program, for example, a sound playing program or an image playing program, required by at least one function. The data storage area may store data (for example, audio data or an address book) created based on use of the terminal, and the like. In a specific implementation of the present invention, the storage unit 105 may include a volatile memory, for example, a nonvolatile random access memory (NVRAM), a phase change random access memory (Phase Change RAM, PRAM), or a magetoresistive random access memory (Magetoresistive RAM, MRAM), and may further include a nonvolatile memory, for example, at least one magnetic disk storage, an electrically erasable programmable read-only memory (EEPROM), or a flash memory device, for example, a NOR flash memory or a NAND flash memory. The nonvolatile memory stores an operating system, an application program, and an APP UI extension module that are executed by the processing unit 104. The processing unit 104 loads a running program and data from the nonvolatile memory to memory and stores digital content in a large-capacity storage apparatus. The operating system includes various components and/or drivers for control and management of routine system tasks, for example, memory management, storage device control, and power management, and for facilitating communication between various software and hardware.

In an implementation of the present invention, the operating system may be an Android system of the Google company, an iOS system developed by the Apple company, or a Windows operating system developed by the Microsoft company, or may be a built-in operating system such as Vxworks. The application program includes any application installed on the terminal, including but not limited to a browser, an email, an instant messaging service, text processing, keyboard virtualization, a window widget (Widget), encryption, digital copyright management, speech recognition, voice replication, positioning (for example, a function provided by a global positioning system), music playing, and the like.

The APP UI extension module extends a functional range of a gesture operation on an APP icon or an APP folder, including but not limited to that touching and holding, force touch, rotation, or other operations on an icon or a folder triggers a functional menu, a guide arrow, or a functional area to be displayed, to associate a preset action such as dragging or clicking an APP icon or a folder icon with a functional feature setting.

A person skilled in the art may understand that the structure of the terminal shown in FIG. 1 does not constitute a limitation on the present invention. The terminal may be in a bus type structure, or may be in a star type structure, and may include more or fewer parts than those shown in the figure, or some parts may be combined, or a different part deployment may be used. The terminal in this implementation of the present invention includes, but is not limited to, a mobile phone, a mobile computer, a tablet computer, a personal digital assistant (PDA), a media player, a smart television, a wearable device (for example, a smart watch or smart glasses), and a combination of two or more of the above.

Before the embodiments of the present invention are described, scenarios to which the technical solutions of the present invention are applied are described first. When a folder on a terminal includes a plurality of APPs, an operation option of the folder is used to execute a command corresponding to the operation option, so that similar functions or characteristics of the plurality of APPs in the folder are managed together. For example, common settings (for example, a message notification setting and an access permission setting) of a plurality of APPs such as WeChat, QQ, and Sina Weibo in a folder need to be managed, using an Android system as an example, it is unnecessary to turn on or off message notification switches of the APPs such as WeChat, QQ, and Sina Weibo one by one through system settings, and instead, the message notification switches of the APPs such as WeChat, QQ, and Sina Weibo are directly turned on or off by using an operation option of the folder. In some other scenarios, when a common function of an APP in a folder needs to be set, it is unnecessary to first open the folder, find an icon corresponding to the APP, and then perform a corresponding operation, and instead, the common function of the APP is directly set by using an operation option of the folder. For example, a positioning and navigation function of Baidu Maps in a folder needs to be turned on, it is unnecessary to first open the folder, find an icon corresponding to Baidu Maps, and then turn on the positioning navigation function of the APP Baidu Maps, and instead, the positioning navigation function of the APP Baidu Maps is directly turned on by using an operation option of the folder. In some further scenarios, when login authorization on a plurality of APPs on a terminal needs to be performed together, it is unnecessary to choose a login authorization manner for each APP one by one, and instead, login authorization is performed together by using some common social accounts. For example, to free a user from a trouble of registration information entering, login authorization may be directly performed on some APPs by using some common social accounts (for example, a social account such as a QQ, WeChat, Sina Weibo, or Facebook account). That is, some common social platforms usually grant these APPs a login permission. For example, some APPs such as an audio APP (for example, KuGou Music), a video APP (for example, Youku), and a health or fitness APP (for example, Codoon Sports) all support login authorization using a WeChat account. When an operation option corresponding to login authorization (that is, an operation option corresponding to login authorization using a WeChat account) is triggered, the terminal directly performs login authorization on these APPs together by using a WeChat account. In this way, operation steps are simplified, and user experience is effectively improved.

Figure 2:
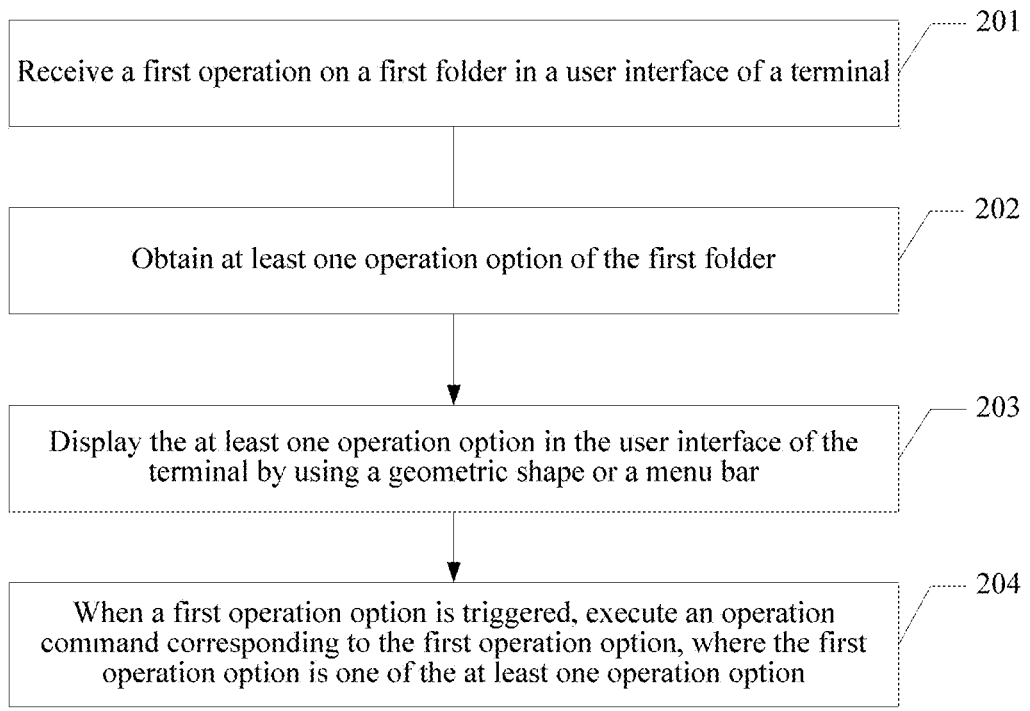
FIG. 2 is a schematic diagram of an embodiment of an application group operation method according to an embodiment of the present invention.

Referring to FIG. 2, FIG. 2 is a schematic diagram of an embodiment of an application APP group operation method according to an embodiment of the present invention. The method is applied to a terminal having a display screen, and a specific procedure of this embodiment includes the following steps.

Step 201. Receive a first operation on a first folder in a user interface of the terminal.

Step 202. Obtain at least one operation option of the first folder.

The at least one operation option is determined based on application configuration files of M APPs in the first folder, and M is an integer greater than 0.

In this embodiment of the present invention, using an Android (Android) system as an example, a new label needs to be defined in an application configuration file (AndroidManifest.xml, which is located below a root directory of an APP, is a global configuration file of an Android application program, and is a configuration file necessary in each Android application program) of each application APP, and labels are divided into two types: system (sys) and app-specific based on function permissions to which the labels belong. A different action identifier (action ID) is configured for each operation option, to execute different operation commands by using operation options. In addition, on the terminal, the operating system needs to parse the label newly added to AndroidManifest.xml. The sys and app-specific types require different parsing processing. To be specific, for the sys type, the operating system (OS) needs to first verify validity of a digital certificate of an APP, and if validity verification succeeds, match an operation option registered by the APP in an application configuration file with a system function of the OS, for the app-specific type (that is, a function specific to an APP), the OS obtains an operation option statement in an application configuration file of the APP. In addition, a system UI module of the terminal needs to be upgraded, to associate an operation option with a preset action on the UI. That is, each action ID is associated with one preset UI action.

The following describes a structure of AndroidManifest.xml by using AndroidManifest.xml of an APP Tmall as an example:

```
<?xmlversion="1.0"encoding="utf-8"?>
<manifest>
<application>
    <action-list app name="Tmall">
    <action type="sys"ID="01">
        <action-name>access GPS</action-name>
    <action type="sys"ID="02">
        <action-name>access camera</action-name>
    <action type="sys"ID="03">
        <action-name>access microphone</action-name>
    <action type="sys"ID="04">
        <action-name>clear cache</action-name>
    <action type="sys"ID="05">
        <action-name>background running</action-name>
    </action>
    <action type="app-specific"ID="06">
        <action-name>logistics notification switch</action-name>
<action-path>app-path-parameter</action-path>
    <action type="app-specific"ID='07'>
        <action-name>clear browsing history</action-name>
<action-path>app-path-parameter</action-path>
    </action>
   </action list>
</application>
```

It should be noted that the foregoing modification on an application APP side and a system side made by using the Android system as an example is also applicable to another system, for example, an iOS system or Windows. This is not specifically limited herein.

In this embodiment of the present invention, the first folder is any folder in the user interface, the first folder includes M APPs, and application configuration files of the M APPs include configuration descriptions of common settings and/or common functions of the APPs, that is, information describing the common settings and/or the common functions of the APPs. The common settings include at least settings on managing permissions opened by the operating system (for example, the Android OS or the IOS) of the terminal to the APPs, for example, reading or modifying contacts, reading location information, invoking a camera, and other access permission settings, a message notification setting, a login authorization setting, a privacy setting, a font size setting, and a language setting. The common functions include service capabilities of the APPs, that is, some commonly used functions of the APPs. For example, Baidu Maps, Gaode Maps, and the like have a positioning and navigation function, WeChat, QQ, and the like have a voice chat function, Jinri Toutiao, Tencent News, and the like have a news pushing function, Alipay, WeChat, and the like have a payment function, Flashlight has a flash function, an application of an enterprise has a sign-in attendance function, Radio FM has a broadcast receiving function, and KuGou has a music playing function.

In this embodiment of the present invention, the first operation includes touching and holding, force touch, or rotation, and the touching and holding, the force touch, and the rotation are all used to trigger an intersection set and/or a union set of the application configuration files of the M APPs to be obtained.

In some possible implementations, the touching and holding is pressing the display screen for a pressing time within a first time range or a second time range. Touching and holding within the first time range is used to trigger the intersection set of the application configuration files of the M APPs to be obtained. When the intersection set is obtained, the application configuration files of the M APPs have at least one piece of same description information. For example, all the APPs have same description information about one or more common functions, or all the APPs have same description information about one or more common settings. Touching and holding within the second time range is used to trigger the union set of the application configuration files of the M APPs to be obtained. When the union set is obtained, the application configuration files of the M APPs may have same description information (for example, the application configuration files of the M APPs have at least one piece of same description information), or may have different description information (for example, the application configuration files of the M APPs are totally different or partially different). The force touch is pressing the display screen with a pressing force magnitude within a first force magnitude range or a second force magnitude range, where force touch within the first force magnitude range is used to trigger the intersection set of the application configuration files of the M APPs to be obtained, and force touch within the second force magnitude range is used to trigger the union set of the application configuration files of the M APPs to be obtained. The rotation is clockwise rotation or counterclockwise rotation on the display screen, where the clockwise rotation is used to trigger the intersection set of the application configuration files of the M APPs to be obtained, and the counterclockwise rotation is used to trigger the union set of the application configuration files of the M APPs to be obtained, or the rotation is rotation on the display screen from a basis point at a rotation angle within a first angle range or a second angle range, where rotation within the first angle range is used to trigger the intersection set of the application configuration files of the M APPs to be obtained, and rotation within the second angle range is used to trigger the union set of the application configuration files of the M APPs to be obtained.

In some other possible implementations, the touching and holding is pressing the display screen for a pressing time within a third time range, where touching and holding within the third time range is used to trigger the intersection set and the union set of the application configuration files of the M APPs to be obtained, the force touch is pressing the display screen with a pressing force magnitude within a third force magnitude range, where force touch within the third force magnitude range is used to trigger the intersection set and the union set of the application configuration files of the M APPs to be obtained, and the rotation is clockwise rotation or counterclockwise rotation on the display screen, where the clockwise rotation is used to trigger the intersection set and the union set of the application configuration files of the M APPs to be obtained, or the counterclockwise rotation is used to trigger the intersection set and the union set of the application configuration files of the M APPs to be obtained, or the rotation is rotation on the display screen from a basis point at a rotation angle within a third angle range, where rotation within the third angle range is used to trigger the intersection set and the union set of the application configuration files of the M APPs to be obtained.

During actual application, the terminal presets a length of time for touching and holding, a force magnitude for force touch, or a manner for rotation (which is usually set on the terminal before delivery, and certainly does not exclude being autonomously set by the user based on a preference). It is assumed that the first time range is T1 to T1+ΔT1, the second time range is T2 to T2+ΔT2, and the third time range is T3 to T3+ΔT3. T1, T2, and T3 each represent a start time, ΔT1, ΔT2, and ΔT3 each represent a time variation, T1, T2, and T3 each are a number greater than or equal to 0, ΔT1, ΔT2, and ΔT3 each are a number greater than 0, and values of T1, T2, and T3 are not fixed. For example, T1 may be greater than or less than or equal to T2. During actual application, it is feasible to implement only a touching and holding operation within the first time range, or implement only a touching and holding operation within the second time range, or implement only a touching and holding operation within the third time range. In this case, the first time range, the second time range, and the third time may be consecutive. For example, the first time range is 0 to 30 ms, the second time range is 30 ms to 60 ms, and the third time range is at least 60 ms. Alternatively, they may alternatively be inconsecutive. For example, the first time range is 0 to 30 ms, the second time range is 40 ms to 60 ms, and the third time range is at least 70 ms. Similarly, for the first force magnitude range, the second force magnitude range, and the third force magnitude range, and for the first angle range, the second angle range, and the third angle range, a definition or setting method similar to that used for the first time range, the second time range, and the third time range is used, and details are not described herein again.

When the user performs a touching and holding, force touch, or rotation operation on the first folder (any folder on the terminal) on the UI of the terminal according to the foregoing requirement (for example, the user performs a touch operation such as the touching and holding, the force touch, or the rotation on an icon or an area corresponding to the first folder on the UI), the terminal may be triggered to perform corresponding calculation on the application configuration files of the M APPs in the first folder, that is, obtain the union set and/or the intersection set of the application configuration files of the M APPs. Based on the foregoing example, for example, when duration when the user touches and holds the first folder on the display screen of the terminal ranges from T1 to T1+ΔT1, the intersection set of the application configuration files of the M APPs is triggered to be obtained, or when duration when the user touches and holds the first folder on the display screen of the terminal ranges to T2+ΔT2, the union set of the application configuration files of the M APPs is triggered to be obtained, or when duration when the user touches and holds the first folder on the display screen of the terminal ranges to T3+ΔT3, the intersection set and the union set of the application configuration files of the M APPs is triggered to be obtained. For another example, when duration when the user touches and holds the first folder on the display screen of the terminal ranges from T1 to T1+ΔT1, the intersection set of the application configuration files of the M APPs is triggered to be obtained, then when the user continues touching and holding so that the duration ranges from T2 to T2+ΔT2, the union set of the application configuration files of the M APPs is triggered to be obtained, and then when the user continues touching and holding so that the duration ranges from T3 to T3+ΔT3, the intersection set and the union set of the application configuration files of the M APPs is triggered to be obtained. Implementation of the force touch or rotation operation is not illustrated herein again. It can be learned that the first operation on the first folder in the user interface of the terminal is used to trigger corresponding calculation on the application configuration files of the M APPs in the first folder, to present different operation options for the user to choose. The user can manage similar functions or characteristics of a plurality of APPs in the folder together by using a lightweight UI, operation complexity is reduced, and user experience is effectively improved.

During actual application, as shown in FIG. 3-a, for example, the terminal is a mobile phone, and it is assumed that a first folder in a user interface of the mobile phone includes four APPs: APP1, APP2, APP3, and APP4. When the mobile phone receives a first operation (for example, touching and holding, force touch, or rotation) of a user on the first folder, the mobile phone obtains application configuration files of the four APPs. For example, when the mobile phone detects that the user touches and holds a display screen of the mobile phone (for example, touches and holds an icon of the first folder or a particular area near the icon, or touches and holds a particular position on the display screen of the mobile phone) and a touching and holding time is within a first time range (for example, the first time range is 0 to 30 ms), an intersection set of the application configuration files of the four APPs is triggered to be obtained. Alternatively, when the mobile phone detects that the user touches and holds the display screen of the terminal and a touching and holding time is within a second time range (for example, the second time range is 30 ms to 60 ms), a union set of the application configuration files of the four APPs is triggered to be obtained. Alternatively, when the mobile phone detects that the user touches and holds the display screen of the mobile phone and a touching and holding time is within a first time range (for example, the first time range is 0 to 30 ms), the intersection set of the application configuration files of the four APPs is triggered to be obtained, and then when the user continues touching and holding so that the touching and holding time is within a second time range (for example, the second time range is 30 ms to 60 ms), the union set of the application configuration files of the four APPs is triggered to be obtained. Alternatively, when the mobile phone detects that the user touches and holds the display screen of the mobile phone and a touching and holding time is within a second time range (for example, the second time range is 0 to 30 ms), the union set of the application configuration files of the four APPs is triggered to be obtained, and then when the user continues touching and holding so that the touching and holding time is within a first time range (for example, the first time range is 30 ms to 60 ms), the intersection set of the application configuration files of the four APPs is triggered to be obtained. Alternatively, when the user touches and holds the display screen of the mobile phone and a touching and holding time is within a third time range (for example, the third time range is at least 60 ms), the intersection set and the union set of the application configuration files of the four APPs are triggered to be obtained. The first time range, the second time range, and the third time range may be consecutive, or may be inconsecutive. Details are not described herein again. Based on the example in which the first operation is the touching and holding, when the first operation is the force touch or the rotation, a method similar to that used for the touching and holding is used, and details are not described herein again.

It should be noted that during actual application, in addition to the touching and holding, the force touch, and the rotation, the first operation may be another operation, for example, clicking, sliding, or dragging, for example, dragging the icon of the first folder for horizontal or vertical movement on the display screen. This is not specifically limited herein.

During actual application, the first operation may be further used to trigger a common management function operation in the first folder. For example, the first operation is used to trigger "renaming", "deleting", or "moving" or the like on the M APPs in the first folder. The first operation includes touching and holding, force touch, or rotation or the like. For example, it is assumed that a time of touching and holding on the display screen of the terminal reaches a fourth time range (different from the first time range, the second time range, and the third time range). Then in this touching and holding operation, an operation within the first time range and/or the second time range may be completed first, and then an operation within the fourth time range is implemented, that is, "renaming", "deleting", or "moving" or the like in the first folder is triggered. Alternatively, in this touching and holding operation, an operation within the fourth time range, that is, "renaming", "deleting", or "moving" or the like in the first folder, may be implemented first, and then an operation within the first time range, the second time range, and/or the third time range is completed. Certainly, the first operation may be further used to trigger a common management function operation in the first folder while triggering the union set of the application configuration files of the M APPs to be obtained. For example, some management function operations (renaming, deleting, and the like) in the first folder may be merged into a touching and holding operation within the second time range. When touching and holding is within the second time range, determined operation options include an operation option of performing a management function operation in the first folder, and may be displayed in the user interface for the user to perform a corresponding operation.

In some possible implementations, determining the at least one operation option of the first folder includes: triggering, by using the first operation on the first folder in the user interface of the terminal, calculation on the application configuration files of the M APPs in the first folder (that is, obtaining the intersection set or the union set of the application configuration files of the M APPs). Interaction between the user and the terminal is enhanced by using a lightweight UI, and user experience is effectively improved. During actual application, the at least one operation option of the first folder is determined by obtaining the intersection set and/or the union set of the application configuration files of the M APPs. An operation option determined by obtaining the intersection set is used to trigger an operation command to be executed on the M APPs, and an operation option determined by obtaining the union set is used to trigger an operation command to be executed on at least one of the M APPs.

Based on the foregoing example of FIG. 3-a, it is assumed that the four APPs: APP1, APP2, APP3, and APP4 in the first folder respectively correspond to KuGou Music, Youku, Sina Weibo, and Jinri Toutiao. After detecting that the user performs the first operation on the first folder, the mobile phone obtains application configuration files of the four APPs. Based on the foregoing example, it is assumed that duration when the user touches and holds the first folder on the display screen of the mobile phone is within the first time range. Then an intersection set of the application configuration files of the four APPs is triggered to be obtained, and an operation option for the user to choose is determined by obtaining the intersection set of the application configuration files of these APPs, and then is presented in a specific form (for example, a menu, a categorization arrow, or different color zones) on the UI for the user to choose. For example, the application configuration files of the four APPs have information describing access permission management, message notification management, a supported login authorization manner, a new message alert sound setting, playing music added to favorites, resuming playing a video interrupted last time, and the like. After the intersection set is obtained, there may be an operation option corresponding to access permission management, an operation option corresponding to notification management, an operation option corresponding to the new message alert sound setting, and the like. If the user wants to set common functions (for example, new message alert sounds) of the four APPs, the user may choose the operation option corresponding to the new message alert sounds, to set the new message alert sounds of the four APPs together, for example, set the new message alert sounds to silent, or to a specific tone. For another example, based on the foregoing example, it is assumed that duration when the user touches and holds the first folder on the display screen of the mobile phone is within the second time range. Then a union set of the application configuration files of the four APPs is triggered to be obtained, and an operation option for the user to choose is determined by obtaining a union set of common settings and/or common functions in the application configuration files of the four APPs. After the union set is obtained, in addition to the operation options generated after the intersection set is obtained, there may be further an operation option corresponding to authorizing another APP to be logged in to by using a Sina Weibo account, an operation option corresponding to playing music added to favorites, an operation option corresponding to resuming playing a video interrupted last time, and the like. If the user wants to log in to another APP by using a Sina Weibo account, the user may choose the operation option corresponding to authorizing another APP to be logged in to by using a Sina Weibo account, to log in to at least one APP in KuGou Music, Youku, and Jinri Toutiao (for example, may log in to an APP in a logout state). For still another example, based on the foregoing example, it is assumed that duration when the user touches and holds the first folder on the display screen of the mobile phone is within the third time range, the intersection set and the union set of the application configuration files of the four APPs are triggered to be obtained. For example, the intersection set and the union set of the application configuration files of the four APPs are synchronously or asynchronously obtained. Details are not described herein.

It should be noted that in some possible implementations, before the receiving a first operation on a first folder in a user interface of the terminal, the method further includes: determining the at least one operation option of the first folder.

In this way, when the first operation on the first folder in the user interface of the terminal is received, the at least one operation option of the first folder is directly obtained by using the first operation. For example, the terminal determines the at least one operation option of the first folder in advance or determines the at least one operation option of the first folder by using a third party (for example, another device other than the terminal). When the first operation on the first folder in the user interface of the terminal is received, at least one corresponding operation option may be obtained for the first operation locally or by using the third party. For example, the first operation is used to trigger the operation option determined by obtaining the intersection set of the application configuration files of the M APPs to be obtained, or the first operation is used to trigger the operation option determined by obtaining the intersection/union set of the application configuration files of the M APPs to be obtained, or the first operation is used to trigger an operation option determined by obtaining the intersection set and the union set of the application configuration files of the M APPs to be obtained. A definition of the first operation is not described herein again. In addition, the first operation may further trigger the at least one operation option of the first folder to be directly obtained, and trigger the at least one operation option to be displayed in the user interface. This is not specifically limited herein. In some other possible implementations, when the first operation on the first folder in the user interface of the terminal is received, the first operation is used to trigger the at least one operation option of the first folder to be determined. For example, when the first operation on the first folder in the user interface of the terminal is received, the terminal obtains the application configuration files of the M APPs in the first folder, and determines the at least one operation option of the first folder based on the application configuration files of the M APPs. This is not specifically limited herein.

The at least one operation option of the first folder is determined before the first operation on the first folder in the user interface of the terminal is received. For example, after the M APPs are put into the folder, the terminal may determine, at any time before the first operation on the first folder is received, an operation option corresponding to the intersection set and/or the union set of the application configuration files of the M APPs. Therefore, when the first operation on the first folder is received, the at least one operation option of the first folder may be directly obtained, thereby increasing a running speed of the terminal.

Step 203. Display the at least one operation option in the user interface of the terminal by using a geometric shape or a menu bar.

During actual application, the at least one operation option is displayed in the user interface of the terminal by using the geometric shape (for example, a sector, a rectangle, an ellipse, or an arrow, which is not specifically limited herein) or the menu bar for the user to choose. Each geometric-shape area corresponds to one operation option or one type of operation option, or each operation option is displayed in the menu bar in a user-defined or terminal-default order. Each geometric-shape area may be further distinguished by using a color, an orientation, or a text description. For example, any geometric shapes in different colors each correspond to one or one type of operation option, or any geometric shapes in different orientations each correspond to one or one type of operation option, or any geometric shapes with different text descriptions each correspond to one or one type of operation option. All the geometric shapes may be the same (for example, four or four types of operation options are displayed by using four identically shaped sectors in different colors), or be different (for example, four or four types of operation options are displayed by using four different geometric shapes). During actual application, if operation options cannot be all displayed on one display screen, some operation options may be triggered to be displayed on a next display screen by dragging, sliding, or other gesture operations, for example, dragging the icon of the first folder for clockwise or counterclockwise rotation to perform a screen switching operation for operation options, or the icon of the first folder may be dragged for horizontal or vertical movement to perform screen switching for operation options. This is not specifically limited herein. Sorting (for example, vertical sorting, horizontal sorting, or clockwise or counterclockwise sorting) of the operation options in the user interface may be defined by the user, or may be determined by the terminal according to a specific rule (for example, by default or based on a use frequency or a name).

In some possible implementations, the displaying the at least one operation option in the user interface of the terminal by using a geometric shape or a menu bar includes: when the at least one operation option of the first folder is determined by obtaining the union set of the application configuration files of the M APPs, prioritizing, based on a use frequency or a use permission, the at least one operation option determined by obtaining the union set, and displaying some operation options having a high priority in the user interface of the terminal by using the geometric shape or the menu bar.

During actual application, when the at least one operation option of the first folder is determined by obtaining the union set of the application configuration files of the M APPs, an excessive quantity of operation options may be obtained, resulting in miscellaneous content when all the operation options are displayed in the user interface, making it inconvenient for the user to choose a corresponding operation option. For example, the operation options cannot be all displayed on one user interface but are displayed by using a plurality of user interfaces. In this case, the user needs to switch between user interfaces through sliding or dragging, to choose a corresponding operation option. User experience is relatively poor. Therefore, the at least one operation option determined by obtaining the union set may be prioritized based on the use frequency or the use permission (for example, a limitation scope of an application scenario corresponding to the operation option), and then some operation options having a high priority are displayed in the user interface of the terminal by using the geometric shape or the menu bar. For example, some operation options have a high use frequency, some operation options have a low use frequency, and the operation options having the high use frequency are preferentially displayed in the user interface. Alternatively, some operation options are limited in some application scenarios, some operation options are not limited in application scenarios, and operation options having a high use permission are preferentially displayed in the user interface. A specific display manner is described above, and details are not described herein again. It should be noted that in addition to prioritizing the operation options based on the use frequency or the use permission, the operation options may alternatively be sorted in one or more manners such as a user-defined manner or a terminal-default manner. This is not specifically limited herein.

It should be noted that in some possible implementations, step 203 is optional. For example, after the at least one operation option of the first folder is determined based on the application configuration files of the M APPs, the at least one operation option does not need to be displayed in the user interface of the terminal, and an operation may be performed in the background of the terminal. Alternatively, after the at least one operation option of the first folder is obtained, the at least one operation option does not need to be displayed in the user interface of the terminal, and an operation may be performed in the background of the terminal. This is not specifically limited herein.

During actual application, as shown in FIG. 3-*b*, for example, the first folder includes M e-commerce-related APPs (for example, Tmall, Jindong, Vipshop, Yihaodian, and Amazon), and it is assumed that application configuration files of the e-commerce APPs such as Tmall, Jindong, Vipshop, Yihaodian, and Amazon include at least description information about clearing browsing history, a pushing notification switch, a background running switch, a logistics notification switch, and the like. When the terminal receives the first operation of the user on the first folder, and the first operation is used to trigger an intersection set of the application configuration files of the M APPs to be obtained (for example, duration when the user presses the display screen is within the first time range, or a force used when the user presses the display screen is within the first force magnitude range, or an angle of rotation of the user on the display screen is within the first angle range), the terminal obtains the intersection set of the application configuration files of the e-commerce APPs such as Tmall, Jindong, Vipshop, Yihaodian, and Amazon, to determine four operation options: an operation option corresponding to clearing browsing history, an operation option corresponding to the pushing notification switch, an operation option corresponding to the background running switch, and an operation option corresponding to the logistics notification switch shown in FIG. 3-b, and displays the four operation options in the user interface of the terminal by using arrows. Operation options corresponding to all the arrows may be distinguished by using different colors. For example, the four operation options are respectively distinguished by using a yellow arrow, a blue arrow, a red arrow, and a green arrow, or directly distinguished by using a text corresponding to each operation option (to be specific, as shown in FIG. 3-b, a text corresponding to an operation option is displayed on an area of each arrow). Alternatively, the four operation options are distinguished by using upper, lower, left, right spatial positions. This is not specifically limited herein.

As shown in FIG. 3-c, it is assumed that the first folder includes a plurality of APPs such as Flashlight, Jindong Mall, Baidu Maps, Amazon, a mobile-phone sign-in APP of an enterprise, and an application configuration file of Flashlight includes at least description information about turning on flash, application configuration files of Jindong Mall and Amazon each include at least description information about a logistics notification switch, an application configuration file of Baidu Maps includes at least description information about a GPS access switch, an application configuration file of the mobile-phone sign-in APP of the enterprise includes description information about mobile-phone sign-in. When the terminal receives the first operation of the user on the first folder, and the first operation is used to trigger a union set of application configuration files of these APPs to be obtained (for example, duration when the user presses the display screen is within the second time range, or a force used when the user presses the display screen is within the second force magnitude range, or an angle of rotation of the user on the display screen is within the second angle range), the terminal obtains the union set of the application configuration files of these APPs, to determine four operation options: an operation option corresponding to turning on flash of Flashlight, an operation option corresponding to mobile-phone sign-in, an operation option corresponding to turning on a logistics notification switch, and an operation option corresponding to turning on a GPS access switch shown in FIG. 3-c, and displays the four operation options in the user interface of the terminal by using sectors. Operation options corresponding to all sector areas may be distinguished by using different colors. For example, the four operation options are respectively distinguished by using a pink sector area, a blue sector area, a yellow sector area, and a green sector area, or directly distinguished by using a text corresponding to each operation option (to be specific, as shown in FIG. 3-c, a text corresponding to an operation option is displayed on each sector area). Alternatively, the four operation options are distinguished by using upper, lower, left, right spatial positions. This is not specifically limited herein. Certainly, if the APP Flashlight in the first folder is currently in a flash on state, after the user performs the first operation on the first folder, a corresponding operation option displayed on the UI in FIG. 3-c may turn to turning off flash of Flashlight. Similarly, if Baidu Maps is currently in a GPS accessible state, after the user performs the first operation on the first folder, a corresponding operation option displayed on the UI in FIG. 3-c may turn to turning off the GPS access switch, and so on. In other words, when determining an operation option, the terminal may specifically refer to a current state of a common setting and/or a common function of each APP. In addition, in this embodiment, alternatively, each operation option displayed on the UI may not clearly describe a subsequently executable operation command. For example, FIG. 3-c may display an operation option of setting the logistics notification switch and an operation option of setting the GPS access switch. When the user chooses the operation option of setting the logistics notification switch, a next-level setting interface may be displayed, making it convenient for the user to turn on or off the logistics notification switch, and so on. Details are not described herein.

As shown in FIG. 3-d, it is assumed that the first folder includes a plurality of audio and video APPs (for example, Baidu Music, QQ Music, and Sohu Video), and application configuration files of the APPs such as Baidu Music, QQ Music, and Sohu Video include at least description information about clearing browsing history, a background running switch, a cache clearing switch, and the like. In addition, an application configuration file of Baidu Music further includes description information about a ranking list in Baidu Music, an application configuration file of Sohu further includes description information about playing history in Sohu Cinema, and an application configuration file of QQ Music further includes description information about songs added to favorites in QQ Music. When the terminal receives the first operation of the user on the first folder, calculation on the application configuration files of the APPs is triggered, that is, an intersection set and a union set of the application configuration files of the plurality of audio and video APPs in the first folder are obtained. A specific manner of the first operation is described above, and details are not described herein again. As shown in FIG. 3-d, an operation option determined when the intersection set of the application configuration files of Baidu Music, QQ Music, and Sohu includes: an operation option corresponding to the cache clearing switch, an operation option corresponding to the background running switch, and an operation option corresponding to clearing browsing history, an operation option determined when the union set of the application configuration files of Baidu Music, QQ Music, and Sohu includes: an operation option corresponding to the songs added to favorites in QQ Music, an operation option corresponding to the playing history in Sohu Cinema, and an operation option corresponding to the ranking list in Baidu Music. After these operation options are determined, these operation options are displayed in the user interface of the terminal by using the geometric shape or the menu bar. A specific method for displaying an operation option in a user interface is not described herein again.

Step 204. When a first operation option is triggered, execute an operation command corresponding to the first operation option, where the first operation option is one of the at least one operation option.

During actual application, for example, after detecting that the user chooses the operation option corresponding to access permission management, the terminal displays an access permission management interface for the user to manage at least one access permission, to execute a corresponding operation command, for example, forbidding reading or modifying contacts, forbidding reading location information, or permitting invoking a camera. Alternatively, after detecting that the user directly chooses, on the UI, an operation option (for example, forbidding reading or modifying contacts) corresponding to management on a specific access permission, the terminal directly executes a corresponding operation command (that is, forbidding these APPs in the folder to read or modify contact information on the terminal), after detecting that the user chooses the operation option corresponding to flash of Flashlight, the terminal directly executes a corresponding operation command, that is, turns on the flash function of Flashlight, after detecting the operation option corresponding to login authorization (for example, login authorization using a QQ account), the terminal directly executes a corresponding operation command, for example, performs, by using a QQ account (which may be an account that has been used to log in to QQ software on the terminal, or may be an account that is instantly entered by the user), login authorization on all APPs in the folder that support a QQ account login manner and are in a logout state.

In some possible implementations, when the application configuration files of the M APPs include information indicating that login using at least one social account is supported, and the M APPs are in a logout state, the executing an operation command corresponding to the first operation option includes: when the first operation option is an operation option determined by obtaining the intersection set based on the information of the M APPs that indicates that login using the at least one social account is supported, authorizing the M APPs to be logged in to by using a first social account, where the first social account is one of the at least one social account, or when the first operation option is an operation option determined by obtaining the union set based on the information of the M APPs that indicates that login using the at least one social account is supported, authorizing at least one of the M APPs to be logged in to by using a second social account, where the second social account is one of the at least one social account.

In some other possible implementations, when the application configuration files of the M APPs include the information indicating that login using the at least one social account is supported, and the M APPs are in a login state, the executing an operation command corresponding to the first operation option includes: when the first operation option is the operation option determined by obtaining the intersection set based on the information of the M APPs that indicates that login using the at least one social account is supported, and the M APPs include an APP that has been logged in to by using a non-third social account, authorizing the APP that has been logged in to by using the non-third social account to switch to login using a third social account, where the third social account is one of the at least one social account, or when the first operation option is the operation option determined by obtaining the union set based on the information of the M APPs that indicates that login using the at least one social account is supported, and the M APPs include APPs that have been logged in to by using a non-fourth social account, authorizing at least one of the APPs that have been logged in to by using the non-fourth social account to switch to login using a fourth social account, where the fourth social account is one of the at least one social account.

It should be noted that the information indicating that login using the at least one social account is supported is configured in the application configuration files of the M APPs when the M APPs are installed on the terminal. For a definition manner for the information in AndroidManifest.xml, refer to the foregoing example of the APP Tmall. Details are not described herein again.

It should be noted that in some possible implementations, when application configuration files of N (N is an integer greater than 0 and less than M) of the M APPs include the information indicating that login using the at least one social account is supported, and the N APPs are in the logout state, when the first operation option is the operation option determined by obtaining the intersection set based on the information of the M APPs that indicates that login using the at least one social account is supported, the N APPs are authorized to be logged in to by using the first social account, where the first social account is one of the at least one social account, or when the first operation option is the operation option determined by obtaining the union set based on the information of the M APPs that indicates that login using the at least one social account is supported, at least one of the N APPs is authorized to be logged in to by using the second social account, where the second social account is one of the at least one social account.

In some other possible implementations, when the application configuration files of N of the M APPs include the information indicating that login using the at least one social account is supported, and the N APPs are in the login state, when the first operation option is the operation option determined by obtaining the intersection set based on the information of the M APPs that indicates that login using the at least one social account is supported, and the N APPs include an APP that has been logged in to by using the non-third social account, the N APPs that have been logged in to by using the non-third social account are authorized to switch to login using the third social account, where the third social account is one of the at least one social account, or when the first operation option is the operation option determined by obtaining the union set based on the information of the M APPs that indicates that login using the at least one social account is supported, and the N APPs include an APP that has been logged in to by using the non-fourth social account, at least one of the N APPs that have been logged in to by using the non-fourth social account is authorized to switch to login using the fourth social account, where the fourth social account is one of the at least one social account.

During actual application, the at least one operation option is determined based on the information, indicating that login using the at least one social account (an account registered with a social platform) is supported, in the M APPs in the first folder. To be specific, login authorization manners supported by all APPs marked as logout are obtained, the login authorization manners are provided as operation options for the user to choose, and the user chooses one of the login authorization manners to act on all the APPs in the first folder or an APP chosen by the user. It is assumed that the first folder includes a plurality of APPs such as Jinri Toutiao, Changba, and Zhihu, and the APPs such as Jinri Toutiao, Changba, and Zhihu support at least login using at least one social account such as a QQ and/or Sina Weibo account. When the first operation of the user on the first folder triggers an intersection set of login authorization manners supported by the APPs such as Jinri Toutiao, Changba, and Zhihu to be obtained, a determined operation option includes an operation option corresponding to QQ login authorization and an operation option corresponding to Sina Weibo login authorization, and these operation options are displayed in the user interface of the terminal for the user to choose. As shown in FIG. 3-*e*, corresponding operation options are displayed in the user interface by using rectangles. Certainly, another manner may alternatively be used. This is not specifically limited herein. If the user chooses the operation option corresponding to QQ login authorization, the APPs such as Jinri Toutiao, Changba, and Zhihu may be logged in to in the foreground or background of the terminal by using a QQ account. When login is performed in the foreground of the terminal, a login interface (including a social account number and a user password) may be provided in the user interface of the terminal, so that the user enters a QQ account number and a password on the login interface to log in to the APPs such as Jinri Toutiao, Changba, and Zhihu. When login is performed in the background of the terminal, login may be performed by using a QQ account that has been used for login. This is not specifically limited herein.

In addition, as shown in FIG. 3-*e*, it is assumed that the first folder includes a plurality of APPs such as Jinri Toutiao, Changba, and Zhihu, and the APPs such as Jinri Toutiao, Changba, and Zhihu support at least login using a QQ account. In addition, Changba supports login using a Sina Weibo account. When the first operation performed by the user triggers a union set of login authorization manners supported by the APPs such as Jinri Toutiao, Changba, and Zhihu to be obtained, a determined operation option includes an operation option corresponding to QQ login authorization and an operation option corresponding to Sina Weibo login authorization, and Changba may be authorized to be logged in to by using a Sina Weibo account. A specific login manner is similar to the foregoing manner for login using QQ, and details are not described herein again.

In addition, based on the foregoing example of FIG. 3-*e*, assuming that Jinri Toutiao is currently in the login state and is logged in to by using a WeChat account, the user may be queried, by using the user interface, whether to switch to login authorization using a QQ account. If the user chooses yes, the terminal switches Jinri Toutiao to login authorization using a QQ account (that is, Jinri Toutiao exits the original WeChat account login manner, and is re-logged in to by using a QQ account). If the user chooses no, the original login manner is retained. Certainly, during actual application, another common setting, for example, an access permission switch or background running switch setting, may be further performed on the M APPs in the first folder. Details are not described herein.

Referring to FIG. 4, FIG. 4 is a schematic diagram of an embodiment of an application APP operation method according to an embodiment of the present invention. The method is applied to a terminal having a display screen, and a specific procedure of this embodiment includes the following steps.

Step 401. When a first operation on a first social application in a user interface of the terminal is received, determine M APPs supporting login using a first social account in all APPs installed on the terminal.

M is an integer greater than 0, and the first social account is a login account corresponding to the first social application (for example, QQ, WeChat, Sina Weibo, Netease, or Facebook). The first social account may be a QQ account, a WeChat account, a Sina Weibo account, an Email address, or a Facebook account or the like, and is an account registered by a user with a social platform (for example, WeChat, QQ, Sina Weibo, Netease, or Facebook).

The first operation includes touching and holding, force touch, or rotation. The touching and holding is pressing the display screen for a pressing time within a first time range, where touching and holding within the first time range is used to trigger the terminal to determine the APPs supporting login using the first social account. The force touch is pressing the display screen with a pressing force magnitude within a first force magnitude range, and force touch within the first force magnitude range is used to trigger the terminal to determine the APPs supporting login using the first social account. The rotation is clockwise rotation or counterclockwise rotation on the display screen, where the clockwise rotation or the counterclockwise rotation is used to trigger the terminal to determine the APPs supporting login using the first social account, or the rotation is rotation on the display screen from a basis point at a rotation angle within a first angle range, where rotation within the first angle range is used to trigger the terminal to determine the APPs supporting login using the first social account.

The terminal may preset a length of time for touching and holding, a force magnitude for force touch, or a manner for rotation (which is usually set on the terminal before delivery, and certainly does not exclude being autonomously set by the user based on a preference). It is assumed that the first time range is T1 to T1+ΔT1. T1 represents a start time, ΔT1 represents a time variation, T1 is a number greater than or equal to 0, and ΔT1 is a number greater than 0.

For example, the first time range is 0 to 30 ms. Similarly, for the first force magnitude range and for the first angle range, a definition or setting method similar to that used for the first time range is used, and details are not described herein again.

When the user performs, on the first social application on the UI of the terminal in the foregoing manner, the first operation corresponding to the touching and holding, the force touch, or the rotation, the terminal is triggered to determine the M APPs supporting login using the first social account. Specifically, application configuration files of all the APPs installed on the terminal are obtained, where application configuration files of the M APPs include at least information indicating that login using the first social account is supported, and the M APPs supporting login using the first social account are determined based on the application configuration files of all the APPs. For example, assuming that the first social application is the QQ application, when duration when the user touches and holds an icon or an area corresponding to the QQ application on the display screen of the terminal ranges from T1 to T1+ΔT1, the terminal is triggered to determine APPs supporting login using a QQ account. It is assumed that a plurality of APPs such as KuGou, Jinri Toutiao, Changba, and Netease News are installed on the terminal, application configuration files of KuGou, Jinri Toutiao, and Changba include at least description information indicating that login using a QQ account is supported, and an application configuration file of Netease News includes description information indicating that login using a Sina Weibo account is supported. Then the terminal determines, by obtaining the application configuration files of the plurality of APPs such as KuGou, Jinri Toutiao, Changba, and Netease News, APPs: KuGou, Jinri Toutiao, and Changba supporting login using a QQ account. Specifically, using an Android system as an example, the terminal may find, through query based on application configuration files AndroidManifest.xml of APPs installed on the terminal, APPs whose AndroidManifest.xml includes the description information indicating that login using a QQ account is supported.

It should be noted that in addition to the touching and holding, the force touch, and the rotation, the first operation may be another operation, for example, clicking, sliding, or dragging, for example, dragging the icon of the first folder for horizontal or vertical movement on the display screen. This is not specifically limited herein.

Step 402. Determine a first operation option of the first social application, where the first operation option is used to authorize the M APPs to be logged in to by using the first social account.

During actual application, an operation option corresponding to at least one of the M APPs logged in to by using the first social account is determined as the first operation option. In other words, the first operation option is an operation option corresponding to login authorization. For example, assuming that the first social account is a QQ account, and application configuration files of KuGou Music, Jinri Toutiao, and Changba include at least description information indicating that login using a QQ account is supported, the terminal determines, based on the application configuration files of all the installed APPs, that the APPs supporting login using a QQ account are KuGou Music, Jinri Toutiao, Changba, and the like. Further, the terminal obtains an intersection set of application configuration files of the plurality of APPs such as KuGou Music, Jinri Toutiao, and Changba, or in other words, the terminal determines, based on application configuration files of all the installed APPs or all APPs that are installed but have not been logged in to, APPs (KuGou Music, Jinri Toutiao, and Changba) whose corresponding application configuration files include description information indicating that login authorization using a QQ account is supported, to determine the first operation option. The first operation option is used to authorize the plurality of APPs such as KuGou Music, Jinri Toutiao, and Changba to be logged in to by using a QQ account.

Step 403. When the first operation option is triggered, execute an operation command corresponding to the first operation option.

During actual application, the first operation option is chosen by clicking, touching and holding, force touch or in another manner. For example, when the user presses a display area corresponding to the first operation option, the terminal receives an operation instruction input by the user through pressing, and the terminal is triggered to perform the operation command corresponding to the first operation option.

Based on the foregoing example of step 402, if the user chooses the first operation option, these APPs such as KuGou Music, Jinri Toutiao, and Changba may be logged in to in the foreground or background of the terminal by using a QQ account. When login is performed in the foreground of the terminal, a login interface (including a social account number and a user password) may be provided in the user interface of the terminal, so that the user enters a QQ account number and a password on the login interface to log in to these APPs. When login is performed in the background of the terminal, login may be performed by using a QQ account that has been used for login. This is not specifically limited herein.

In this embodiment of the present invention, when the M APPs include an APP in a logout state, the executing an operation command corresponding to the first operation option includes: authorizing the APP in the logout state to be logged in to by using the first social account, and when the M APPs include an APP that is in a login state and is logged in to by using a non-first social account, the executing an operation command corresponding to the first operation option includes: authorizing the APP that is in the login state and is logged in to by using the non-first social account to switch to login using the first social account.

Based on the foregoing example of step 402, if APPs: KuGou Music, Jinri Toutiao, and Changba are all in the logout state, the terminal may log in to the three APPs by using a QQ account. A specific login manner is described above, and details are not described herein again.

If KuGou Music in the APPs: KuGou Music, Jinri Toutiao, and Changba is in the login state, for example, has been successfully logged in to by using a Sina Weibo account, the terminal may log in to APPs: Jinri Toutiao and Changba by using a QQ account. A specific login manner is described above, and details are not described herein again. Alternatively, in addition to logging in to the APPs: Jinri Toutiao and Changba by using a QQ account, a login manner of KuGou Music may be further switched to login using a QQ account. A specific login manner is described above, and details are not described herein again.

Figure 5:
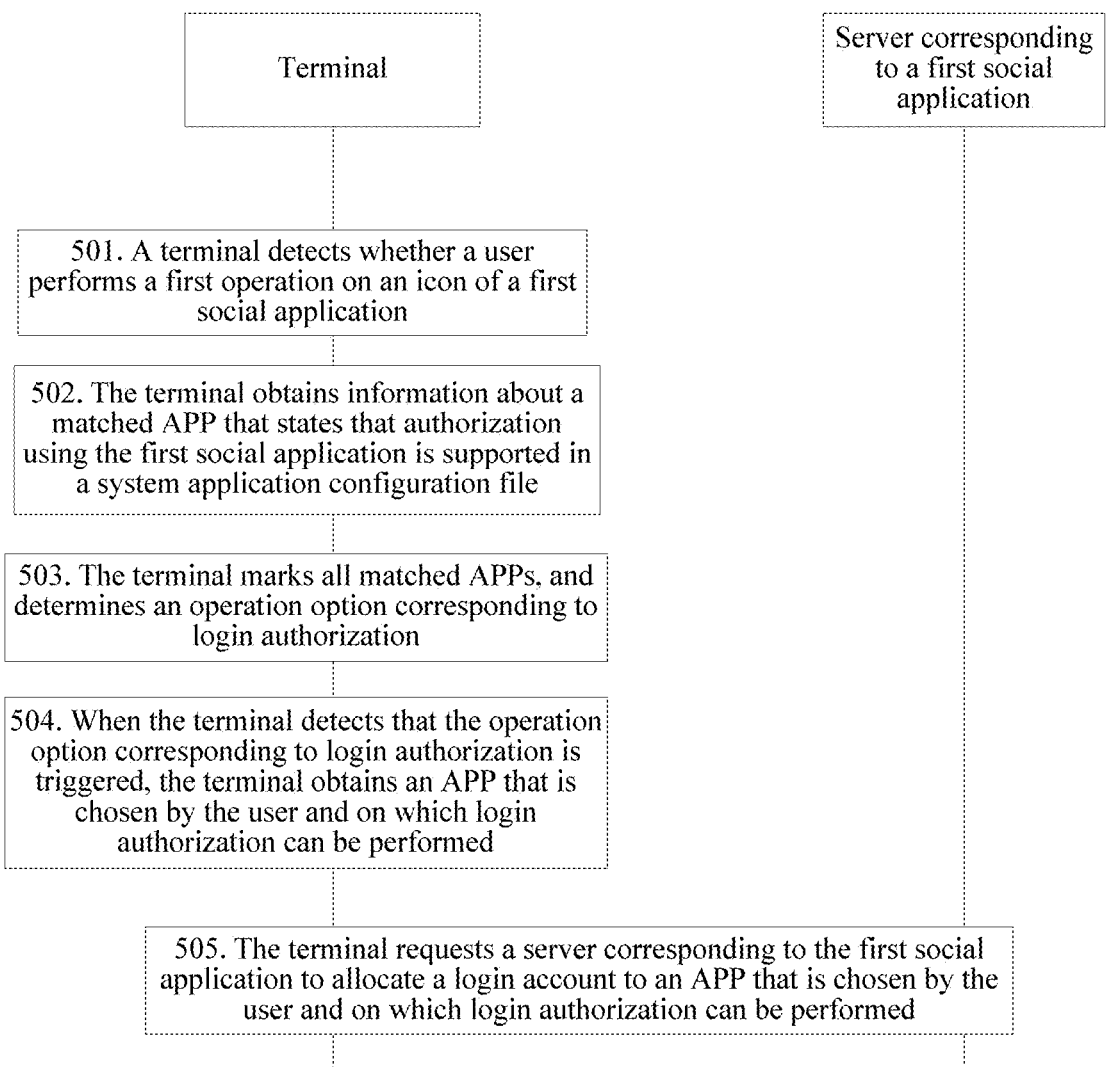
FIG. 5 is a schematic diagram of an application scenario of an application operation method according to an embodiment of the present invention.

In the following, as shown in FIG. 5, a detailed embodiment is described, and a specific procedure includes the following steps.

Step 501. A terminal detects whether a user performs a first operation on an icon of a first social application. If the user performs the first operation on the icon of the first social application, step 502 is performed.

The first social application may be Sina Weibo, Tencent Weibo, WeChat, QQ, Facebook, Twitter, Renren, Netease Email, or the like. The first operation may be an operation such as touching and holding, force touch, or rotation. The terminal may preset a length of time for touching and holding, a force magnitude for force touch, or a manner for rotation (which is usually set on the terminal before delivery, and certainly does not exclude being autonomously set by the user based on a preference). For example, a time of touching and holding on a display screen is within a first time range, where touching and holding within the first time range is used to trigger the terminal to determine an APP supporting login using a first social account. It is assumed that the first time range is T1 to T1+ΔT1. T1 represents a start time, ΔT1 represents a time variation, T1 is a number greater than or equal to 0, and ΔT1 is a number greater than 0. For example, the first time range is 0 to 30 ms. When the terminal detects that the user touches and holds a WeChat icon and a pressing time is 20 ms, the terminal is triggered to perform step 502.

Step 502. The terminal obtains information about a matched APP that states that authorization using the first social application is supported in a system application configuration file.

It is assumed that the first social application is WeChat, and application configuration files of APPs such as Jinri Toutiao, Changba, and iQiyi Video in all APPs installed on the terminal include at least description information indicating that login using a WeChat account is supported. The terminal determines, by obtaining application configuration files of all the APPs, the APPs such as Jinri Toutiao, Changba, and iQiyi Video supporting WeChat login authorization. In addition, the terminal may further implement a maintenance list in a system, when an operation such as installation, update, or deletion occurs on a matched APP, information, indicating that login authorization using the first social account is supported, of the matched APP is registered into the maintenance list. Likewise, when a login status of the matched APP changes, the login status is also registered into the maintenance list.

It should be noted that the system application configuration file may be AndroidManifest.xml, or certainly, may be another system application configuration file, for example, a windows application configuration file. This is not specifically limited herein. In addition, the matched APP supporting login authorization using the first social account and the first social application may be located in a same folder, or may be located in different folders. Step 503 is performed on all APPs supporting login authorization using the first social account.

Step 503. The terminal marks all matched APPs, and determines an operation option corresponding to login authorization.

During actual application, a current account login status of the matched APP is obtained. The terminal obtains the current account login status of the matched APP by querying a running parameter, power consumption, and the like of the matched APP. Certainly, another manner may alternatively be used to obtain the current account login status of the matched APP. This is not specifically limited herein. For example, the terminal determines, by querying running parameters of APPs such as Jinri Toutiao, Changba, and iQiyi Video, that Jinri Toutiao is in a login state (which may be logged in to by using a WeChat account, or may be logged in to by using another social account), and Changba and iQiyi Video are in a logout state.

During actual application, when the matched APP is in the logout state, the matched APP is marked as logout, and information indicating that a login authorization operation may be performed on this APP is displayed, if the matched APP is in the login state, the matched APP is marked as login, and this APP is not repeatedly logged in to when a subsequent authorization operation is performed on APPs together, so that an original login manner is retained or login manner switching is performed.

Step 504. When the terminal detects that the operation option corresponding to login authorization is triggered, the terminal obtains an APP that is chosen by the user and on which login authorization can be performed.

When the terminal detects that the operation option corresponding to login authorization is chosen, all the matched APPs are provided for the user to choose. In other words, the user may autonomously choose an APP for login authorization. Specifically, these APPs may be presented to the user on a UI in any implementable manner for the user to choose. For example, these APPs are presented by using a list, the user may choose a wanted APP for login authorization. For another example, these APPs are presented by using geometric shapes. For example, each sector area is used to present one type of APP (for example, a video APP, an audio APP, a spoils APP, or an e-commerce APP), and the user may touch or choose a wanted type of APP for authorization.

During actual application, in all the matched APPs, some APPs are in the login state, and some APPs are in the logout state (that is, logged in to by using the first social account or logged in to by using a non-first social account). In a possible scenario, the terminal displays current login statuses of all the matched APP in the user interface. Icons of all the matched APPs may be distinguished by being displayed bright or dark, so that the user clearly knows which APPs are in the login state, and which APPs are in the logout state. For example, the matched APPs include Changba and Jinri Toutiao. When Jinri Toutiao is in the login state, an icon of Jinri Toutiao is displayed bright (in red and white colors) in the user interface. When Changba is in the logout state, an icon of Changba is displayed dark (in black and white colors) in the user interface. After the user knows which APPs match the first social account, and in the matched APPs, which APPs are in the login state and which APPs are in the logout state, the user chooses an APP to be logged in to by using the first social account. Certainly, in some other possible scenarios, the terminal only marks the login statuses of all the matched APPs, and does not display the login statuses of all the matched APPs in the user interface. This is not specifically limited herein.

Step 505. The terminal requests a server corresponding to the first social application to allocate a login token to an APP that is chosen by the user and on which login authorization can be performed.

During actual application, the terminal may form a list for the APP that is chosen by the user and on which login authorization can be performed, and send APP names (which may be all sent in a list form or be sent one by one) in the list to the server corresponding to the first social application, so that the server (that is, a social platform) corresponding to the first social application allocates each APP in the list a login token (that is, an account used to log in to the APP), to complete login authorization on the APP chosen by the user, and end the procedure. It is assumed that the first social application is WeChat. The terminal obtains all APPs matching login using a WeChat account, for example, including a plurality of APPs such as Changba, Baidu Maps, Tmall, and Jindong Mall. It is assumed that Changba and Jindong Mall are in the logout state, Baidu Maps is in the login state and is logged in to by using a QQ account, and Tmall is in the login state and is logged in to by using a WeChat account. Then, when the user chooses Changba and Jindong Mall for login authorization, the terminal requests a WeChat server to allocate a login token to Changba and Jindong Mall, so that Changba and Jindong Mall are logged in to by using a WeChat account. When the user chooses Baidu Maps for login authorization, the terminal queries the user whether to switch a login manner. If the user chooses to switch the login manner, Baidu Maps is switched to login using a WeChat account. If the user chooses no, an original login manner is retained. When the user chooses Tmall for login authorization, because the terminal previously marks Tmall as being logged in to by using WeChat, subsequently, Tmall is not repeatedly logged in to. Certainly, a specific implementation is not limited in this embodiment of the present invention.

For better implementing the foregoing related methods in the embodiments of the present invention, the following further provides a related apparatus configured to coordinate with the foregoing methods.

Figure 6:
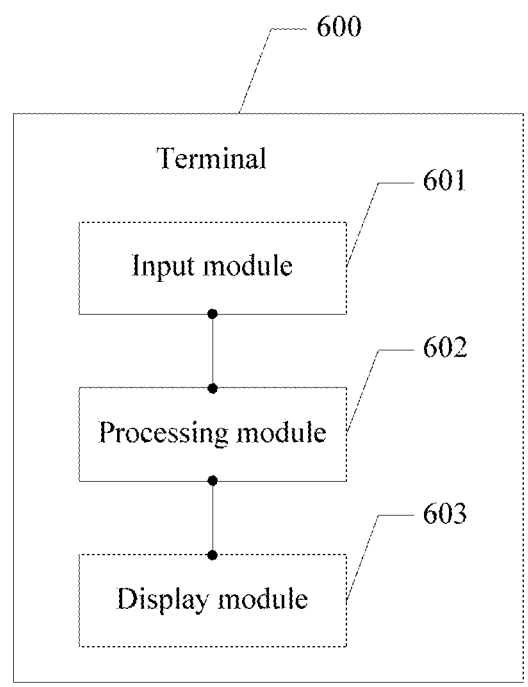
FIG. 6 is another schematic structural diagram of a terminal according to an embodiment of the present invention.

Referring to FIG. 6, FIG. 6 is a schematic structural diagram of a terminal 600 according to an embodiment of the present invention. The terminal 600 is a terminal having a display screen, and the terminal 600 includes an input module 601 and a processing module 602. In some embodiments, the terminal 600 further includes a display module 603.

The input module 601 is configured to receive a first operation on a first folder in a user interface of the terminal. The first operation includes touching and holding, force touch, or rotation, and the touching and holding, the force touch, and the rotation are all used to trigger an intersection set and/or a union set of application configuration files of M APPs to be obtained.

In some possible implementations, the touching and holding is pressing the display screen for a pressing time within a first time range or a second time range, where touching and holding within the first time range is used to trigger the intersection set of the application configuration files of the M APPs to be obtained, and touching and holding within the second time range is used to trigger the union set of the application configuration files of the M APPs to be obtained, the force touch is pressing the display screen with a pressing force magnitude within a first force magnitude range or a second force magnitude range, where force touch within the first force magnitude range is used to trigger the intersection set of the application configuration files of the M APPs to be obtained, and force touch within the second force magnitude range is used to trigger the union set of the application configuration files of the M APPs to be obtained, and the rotation is clockwise rotation or counterclockwise rotation on the display screen, where the clockwise rotation is used to trigger the intersection set of the application configuration files of the M APPs to be obtained, and the counterclockwise rotation is used to trigger the union set of the application configuration files of the M APPs to be obtained, or the rotation is rotation on the display screen from a basis point at a rotation angle within a first angle range or a second angle range, where rotation within the first angle range is used to trigger the intersection set of the application configuration files of the M APPs to be obtained, and rotation within the second angle range is used to trigger the union set of the application configuration files of the M APPs to be obtained.

In some other possible implementations, the touching and holding is pressing the display screen for a pressing time within a third time range, where touching and holding within the third time range is used to trigger the intersection set and the union set of the application configuration files of the M APPs to be obtained, the force touch is pressing the display screen with a pressing force magnitude within a third force magnitude range, where force touch within the third force magnitude range is used to trigger the intersection set and the union set of the application configuration files of the M APPs to be obtained, and the rotation is clockwise rotation or counterclockwise rotation on the display screen, where the clockwise rotation is used to trigger the intersection set and the union set of the application configuration files of the M APPs to be obtained, or the counterclockwise rotation is used to trigger the intersection set and the union set of the application configuration files of the M APPs to be obtained, or the rotation is rotation on the display screen from a basis point at a rotation angle within a third angle range, where rotation within the third angle range is used to trigger the intersection set and the union set of the application configuration files of the M APPs to be obtained.

The processing module 602 is configured to: when the input module receives the first operation on the first folder in the user interface of the terminal, obtain at least one operation option of the first folder, where the at least one operation option is determined based on the application configuration files of the M APPs in the first folder, and M is an integer greater than 0.

The processing module 602 is further configured to determine the at least one operation option of the first folder based on the application configuration files of the M APPs, and when a first operation option is triggered, execute an operation command corresponding to the first operation option, where the first operation option is one of the at least one operation option.

The processing module 602 is further configured to: before the input module 601 receives the first operation on the first folder in the user interface of the terminal, determine the at least one operation option of the first folder.

The processing module 602 is specifically configured to determine the at least one operation option of the first folder by obtaining the intersection set and/or the union set of the application configuration files of the M APPs, where an operation option determined by obtaining the intersection set is used to trigger an operation command to be executed on the M APPs, and an operation option determined by obtaining the union set is used to trigger an operation command to be executed on at least one of the M APPs.

The terminal boo further includes a display module 603, where the display module 603 is configured to: after the processing module 602 obtains the at least one operation option of the first folder, display the at least one operation option in the user interface of the terminal by using a geometric shape or a menu bar.

In some possible implementations, the display module 603 is specifically configured to: when the at least one operation option of the first folder is determined by obtaining the union set of the application configuration files of the M APPs, prioritize, based on a use frequency or a use permission, the at least one operation option determined by obtaining the union set, and choose some operation options having a high priority and display the operation options in the user interface of the terminal by using the geometric shape or the menu bar.

In some possible implementations, when the application configuration files of the M APPs include information indicating that login using at least one social account is supported, and the M APPs are in a logout state, the processing module 602 is specifically configured to: when the first operation option is an operation option determined by obtaining the intersection set based on the information of the M APPs that indicates that login using the at least one social account is supported, authorize the M APPs to be logged in to by using a first social account, where the first social account is one of the at least one social account, or when the first operation option is an operation option determined by obtaining the union set based on the information of the M APPs that indicates that login using the at least one social account is supported, authorize at least one of the M APPs to be logged in to by using a second social account, where the second social account is one of the at least one social account.

In some other possible implementations, when the application configuration files of the M APPs include the information indicating that login using the at least one social account is supported, and the M APPs are in a login state, the processing module 602 is specifically configured to: when the first operation option is the operation option determined by obtaining the intersection set based on the information of the M APPs that indicates that login using the at least one social account is supported, and the M APPs include an APP that has been logged in to by using a non-third social account, authorize the APP that has been logged in to by using the non-third social account to switch to login using a third social account, where the third social account is one of the at least one social account, or when the first operation option is the operation option determined by obtaining the union set based on the information of the M APPs that indicates that login using the at least one social account is supported, and the M APPs include APPs that have been logged in to by using a non-fourth social account, authorize at least one of the APPs that have been logged in to by using the non-fourth social account to switch to login using a fourth social account, where the fourth social account is one of the at least one social account.

It should be noted that the information indicating that login using the at least one social account is supported is configured in the application configuration files of the M APPs when the M APPs are installed on the terminal.

It should be noted that related steps performed by the input module 601, the processing module 602, and the display module 603 may be specifically implemented according to the methods in the embodiments shown in FIG. 2 to FIG. 5. For specific implementation processes thereof, refer to related descriptions in the method embodiments shown in FIG. 2 to FIG. 5. Details are not described herein again. Technical effects that can be achieved in the method embodiments are achieved by performing the methods in the embodiments shown in FIG. 2 to FIG. 5 by using the input module 601, the processing module 602, and the display module 603.

It can be learned that when the input module receives the first operation on the first folder in the user interface of the terminal, the processing module obtains the at least one operation option of the first folder. The at least one operation option is determined based on the application configuration files of the M APPs in the first folder, and M is an integer greater than 0. The application configuration files include information describing common functions and/or common settings of the APPs. The common settings include a service parameter setting, a system permission management setting, and the like of the APPs, for example, reading or modifying contacts, reading location information, invoking a camera, and other access permission settings, a message notification setting, a login authorization setting, a privacy setting, a font size setting, and a language setting. The common functions include service capabilities of the APPs, that is, some commonly used functions of the APPs. For example, Baidu Maps and Gaode Maps have a positioning and navigation function, WeChat and QQ have a voice function, Flashlight has a flash function, an application of an enterprise has a sign-in attendance function, Radio FM has a broadcast receiving function, KuGou has a music playing function, Jinri Toutiao and Tencent News have a news pushing function, and Alipay and WeChat have a payment function. The processing module determines the at least one operation option of the first folder based on the application configuration files of the M APPs. The at least one operation option, for example, an operation option corresponding to a message tone setting, is determined based on the common settings and/or the common functions of the APPs. When the first operation option is triggered, the processing module executes the operation command corresponding to the first operation option. For example, the first operation option is the operation option corresponding to the message tone setting. The processing module sets message tones of the M APPs in the first folder together (for example, sets the message tones to a silent mode or a vibration mode or to a specific tone a user likes) by using the first folder. The message tones do not need to be set one by one, operation steps are simplified, and user experience is effectively improved.

It should be noted that in some optional embodiments, the terminal 600 does not include the display module 603. Whether the terminal 600 includes the display module 603 may be determined depending on an actual situation, and is not specifically limited herein. In addition, the processing module 602 may be a software module that can run in a processor of a computer system, or may be an application-specific integrated circuit, and achieve a corresponding technical effect. This is not specifically limited herein.

Figure 7:
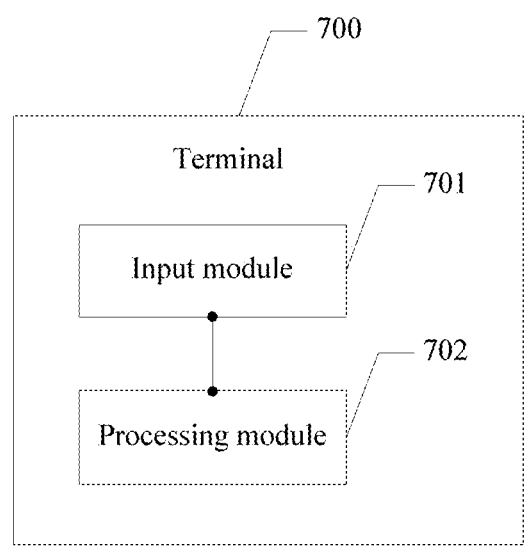
FIG. 7 is another schematic structural diagram of a terminal according to an embodiment of the present invention.

Referring to FIG. 7, FIG. 7 is another schematic structural diagram of a terminal 700 according to an embodiment of the present invention. The terminal 700 is a terminal having a display screen, and the terminal 700 includes an input module 701 and a processing module 702.

The input module 701 is configured to receive a first operation on a first social application in a user interface of the terminal.

The first operation includes touching and holding, force touch, or rotation.

The touching and holding is pressing the display screen for a pressing time within a first time range, where touching and holding within the first time range is used to trigger the terminal to determine APPs supporting login using a first social account.

The force touch is pressing the display screen with a pressing force magnitude within a first force magnitude range, where force touch within the first force magnitude range is used to trigger the terminal to determine the APPs supporting login using the first social account.

The rotation is clockwise rotation or counterclockwise rotation on the display screen, where the clockwise rotation or the counterclockwise rotation is used to trigger the terminal to determine the APPs supporting login using the first social account, or the rotation is rotation on the display screen from a basis point at a rotation angle within a first angle range, where rotation within the first angle range is used to trigger the terminal to determine the APPs supporting login using the first social account.

The processing module 702 is configured to: when the input module receives the first operation on the first social application in the user interface of the terminal, determine M APPs supporting login using the first social account in all APPs installed on the terminal, where M is an integer greater than 0, and the first social account is a login account corresponding to the first social application.

The processing module 702 is specifically configured to obtain application configuration files of all the APPs installed on the terminal, where application configuration files of the M APPs include at least information indicating that login using the first social account is supported, and determine, based on the application configuration files of all the APPs, the M APPs supporting login using the first social account, and determine an operation option corresponding to at least one of the M APPs logged in to by using the first social account, as the first operation option.

The processing module 702 is further configured to determine a first operation option of the first social application, where the first operation option is used to authorize the M APPs to be logged in to by using the first social account, and when the first operation option is triggered, execute an operation command corresponding to the first operation option.

In some possible implementations, when the M APPs include an APP in a logout state, the processing module is specifically configured to authorize the APP in the logout state to be logged in to by using the first social account, and when the M APPs include an APP that is in a login state and is logged in to by using a non-first social account, the processing module is specifically configured to authorize the APP that is in the login state and is logged in to by using the non-first social account to switch to login using the first social account.

It can be learned that when the input module receives the first operation of a user on the first social application in the user interface of the terminal, the processing module obtains information about application configuration files of all the APPs installed on the terminal or all APPs in the logout state, to check whether these configuration files include description information indicating that login authorization using the first social account is supported. If these configuration files include the description information, the terminal determines that the first operation option is authorizing corresponding APPs to be logged in to by using the first social account, so that after the user chooses the first operation, these APPs are logged in to together by using the first social account. For example, it is assumed that the first social application is a QQ application, application configuration files of APPs: a first music application (for example, KuGou Music), a first video application (for example, Youku), a first news application (for example, Jinri Toutiao), a first fitness application (for example, Codoon Sports), and a first game application (for example, Kupao) on the terminal all include description information indicating that login authorization using a QQ account is supported. Then it is determined that the first operation option is authorizing these APPs to be logged in to by using a QQ account. After the user chooses the first operation option, these APPs are logged in to together by using a QQ account. It can be learned that the first operation option of the first social application is used for login authorization on the M APPs on the terminal, it is unnecessary to choose an authorization manner for each APP one by one, and instead, login authorization management is directly performed together based in the user interface. User experience is effectively improved.

Figure 8:
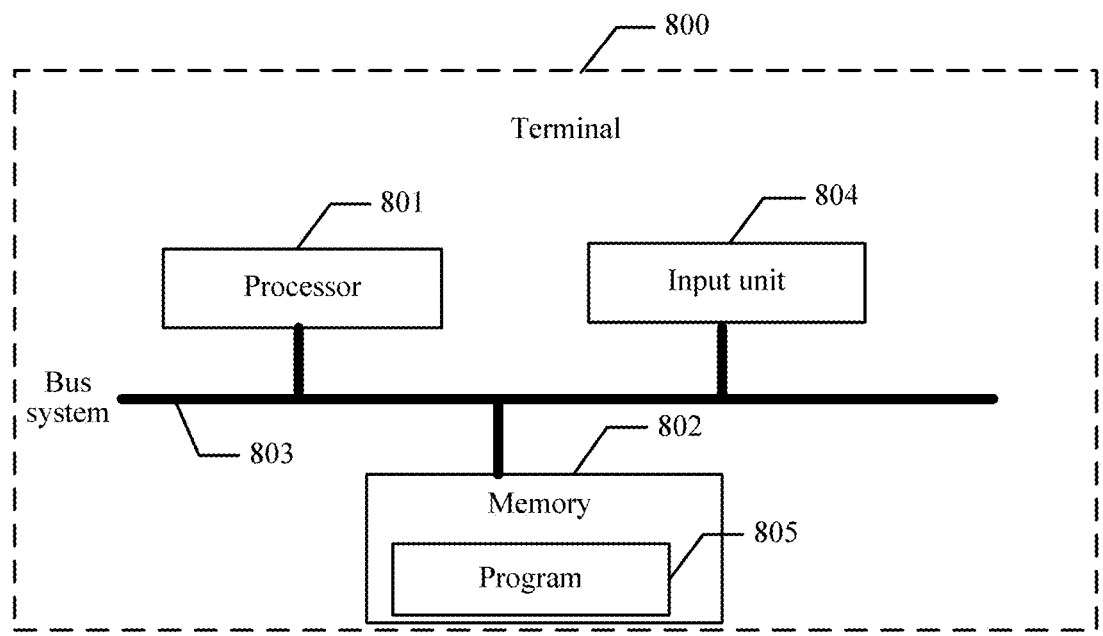
FIG. 8 is another schematic structural diagram of a terminal according to an embodiment of the present invention.

The embodiments shown in FIG. 6 and FIG. 7 describe specific structures of terminals from the perspective of functional modules. The following describes a specific structure of a terminal by using an embodiment of FIG. 8 from the perspective of hardware. A terminal 800 includes: one or more processors 801, a memory 802, a bus system 803, and an input unit 804. The one or more processors 801, the memory 802, the input unit 804, and the display are connected by using the bus system 803.

The memory 802 stores one or more programs 805, the one or more programs 805 include an instruction, and when the instruction is executed by the terminal 800, the terminal 800 performs the method described in any one of the embodiments shown in FIG. 2 to FIG. 5.

It should be noted that functions of the terminal in the present invention may be specifically implemented according to the methods in the embodiments shown in FIG. 2 to FIG. 5. For specific implementation processes thereof, refer to related descriptions in the method embodiments shown in FIG. 2 to FIG. 5. Details are not described herein again. Technical effects that can be achieved in the method embodiments are achieved by performing the methods in the embodiments shown in FIG. 2 to FIG. 5 by using the terminal.

Figure 9:
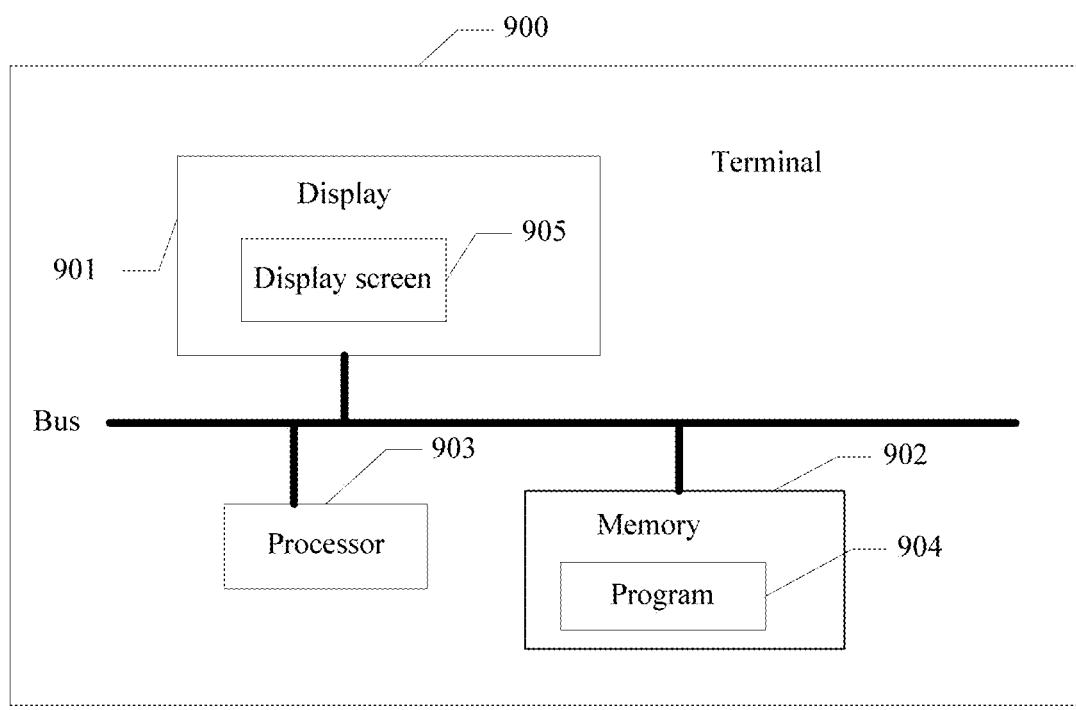
FIG. 9 is another schematic structural diagram of a terminal according to an embodiment of the present invention.

The present invention further provides a graphical user interface on a terminal. Referring to FIG. 9, the terminal 900 includes a display 901, a memory 902, and one or more processors 903 configured to execute one or more programs 904 stored in the memory 902, and the graphical user interface includes a user interface displayed in the method described in any one of the embodiments shown in FIG. 2 to FIG. 5. The display 901 includes a display screen 905.

It should be understood that the processor 903 may be a central processing unit (CPU), or the processor 903 may be another general-purpose processor, a digital signal processor (DSP), an application-specific integrated circuit (ASIC), or a field-programmable gate array (FPGA) or another programmable logic device, a discrete gate or a transistor logic device, a discrete hardware component, or the like. The general-purpose processor may be a microprocessor or the processor may be any conventional processor or the like. During implementation, the steps of the application operation method may be completed by using a hardware-integrated logical circuit in the processor 903 or instructions in a form of software, and may be directly performed and completed by a hardware processor, or may be performed and completed by using a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory 902, and the processor 903 reads information in the memory 902 and completes the steps in the foregoing methods in combination with hardware of the processor. To avoid repetition, details are not described herein again.

To conclude, when the terminal receives a first operation on a first folder in the user interface of the terminal, the terminal first obtains at least one operation option of the first folder. The at least one operation option is determined based on application configuration files of M APPs in the first folder, and M is an integer greater than 0. The application configuration files include information describing common functions and/or common settings of the APPs. The terminal determines the at least one operation option of the first folder based on the application configuration files of the M APPs. The at least one operation option is determined by obtaining an intersection set or a union set of the common settings and/or the common functions in the M application configuration files, and then presented in a specific form (for example, a menu, a categorization arrow, or different color zones) on the UI for a user to choose. When a first operation option is triggered, the terminal executes an operation command corresponding to the first operation option. For example, after detecting that the user chooses an operation option corresponding to access permission management, the terminal displays an access permission management interface for the user to manage at least one access permission, to execute a corresponding operation command, for example, forbidding reading or modifying contacts, forbidding reading location information, or permitting invoking a camera. Alternatively, after detecting that the user directly chooses, on the UI, an operation option (for example, forbidding reading or modifying contacts) corresponding to management on a specific access permission, the terminal directly executes a corresponding operation command (that is, forbidding these APPs in the folder to read or modify contact information on the terminal). It can be learned that similar functions or characteristics of the M APPs in the first folder are managed together, operation steps are simplified, and user experience is effectively improved.

In the foregoing embodiments, the descriptions of the embodiments have respective focuses. For a part that is not described in detail in an embodiment, reference may be made to related descriptions in other embodiments.

It may be clearly understood by a person skilled in the art that for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be chosen according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

An application group operation method and a terminal provided in the present invention are detailed above. Specific examples are used in this specification to describe the principle and implementations of the present invention. The foregoing embodiments are merely intended to help understand the method and idea of the present invention. In addition, with respect to the implementations and the application scope, modifications may be made by a person of ordinary skill in the art according to the idea of the present invention. Therefore, the specification shall not be construed as a limitation to the present invention.

What is claimed is:

1. A method comprising:
   receiving, by a terminal having a display screen, a first operation on a first folder in a user interface of the terminal;
   obtaining, by the terminal, at least one operation option of the first folder in the user interface of the terminal, wherein the at least one operation option of the first folder in the user interface of the terminal is determined according to application configuration files of M applications (APPs) in the first folder in the user interface of the terminal, and M is an integer greater than 0, and wherein the first operation on the first folder in the user interface of the terminal triggers an intersection set or a union set of application configuration files corresponding to the M APPs in the first folder in the user interface of the terminal to be obtained; and
   concurrently executing, by the terminal and in response to a first operation option of the at least one operation option of the first folder in the user interface of the terminal being triggered, an operation command corresponding to the first operation option of the at least one operation option of the first folder in the user interface of the terminal on each APP of the M APPs in the first folder in the user interface of the terminal.

2. The method according to claim 1, wherein the first operation on the first folder in the user interface of the terminal comprises touching and holding, force touching, or rotating on the display screen of the terminal.

3. The method according to claim 2, wherein:
   the touching and holding on the display screen of the terminal comprises pressing the display screen of the terminal for a pressing time within a first time range or a second time range, wherein pressing the display screen of the terminal for the pressing time within the first time range triggers the intersection set of the application configuration files corresponding to the M APPs in the first folder in the user interface of the terminal to be obtained, and pressing the display screen of the terminal for the pressing time within the second time range triggers the union set of the application configuration files corresponding to the M APPs in the first folder in the user interface of the terminal to be obtained;
   the force touching on the display screen of the terminal comprises pressing the display screen of the terminal with a pressing force magnitude within a first force magnitude range or a second force magnitude range, wherein pressing the display screen of the terminal with the pressing force magnitude within the first force magnitude range triggers the intersection set of the application configuration files corresponding to the M APPs in the first folder in the user interface of the terminal to be obtained, and pressing the display screen of the terminal with the pressing force magnitude within the second force magnitude range triggers the union set of the application configuration files corresponding to the M APPs in the first folder in the user interface of the terminal to be obtained; and
   the rotating on the display screen of the terminal comprises:
      performing a clockwise rotation or performing a counterclockwise rotation on the display screen of the terminal, wherein performing the clockwise rotation on the display screen of the terminal triggers the intersection set of the application configuration files corresponding to the M APPs in the first folder in the user interface of the terminal to be obtained, and performing the counterclockwise rotation on the display screen of the terminal triggers the union set of the application configuration files corresponding to the M APPs in the first folder in the user interface of the terminal to be obtained; or
      performing a rotation on the display screen of the terminal from a basis point at a rotation angle within a first angle range or a second angle range, wherein performing the rotation on the display screen of the terminal from the basis point at the rotation angle within the first angle range triggers the intersection set of the application configuration files corresponding to the M APPs in the first folder in the user interface of the terminal to be obtained, and performing the rotation on the display screen of the terminal from the basis point at the rotation angle within the second angle range triggers the union set of the application configuration files corresponding to the M APPs in the first folder in the user interface of the terminal to be obtained.

4. The method according to claim 2, wherein:
the touching and holding on the display screen of the terminal comprises pressing the display screen of the terminal for a pressing time within a third time range, wherein pressing the display screen of the terminal for the pressing time within the third time range triggers the intersection set and the union set of the application configuration files corresponding to the M APPs in the first folder in the user interface of the terminal to be obtained;
the force touching on the display screen of the terminal comprises pressing the display screen of the terminal with a pressing force magnitude within a third force magnitude range, wherein pressing the display screen of the terminal with the pressing force magnitude within the third force magnitude range triggers the intersection set and the union set of the application configuration files corresponding to the M APPs in the first folder in the user interface of the terminal to be obtained; and
the rotating on the display screen of the terminal comprises:
performing a clockwise rotation or a counterclockwise rotation on the display screen of the terminal, wherein performing the clockwise rotation on the display screen of the terminal triggers the intersection set and the union set of the application configuration files corresponding to the M APPs in the first folder in the user interface of the terminal to be obtained, and performing the counterclockwise rotation on the display screen of the terminal triggers the intersection set and the union set of the application configuration files corresponding to the M APPs in the first folder in the user interface of the terminal to be obtained; or
performing a rotation on the display screen of the terminal from a basis point at a rotation angle within a third angle range, wherein performing the rotation on the display screen of the terminal from the basis point at the rotation angle within the third angle range triggers the intersection set and the union set of the application configuration files corresponding to the M APPs in the first folder in the user interface of the terminal to be obtained.

5. The method according to claim 1, wherein the method further comprises:
determining the at least one operation option of the first folder in the user interface of the terminal before receiving the first operation on the first folder in the user interface of the terminal.

6. The method according to claim 5, wherein determining the at least one operation option of the first folder in the user interface of the terminal comprises:
determining the at least one operation option of the first folder in the user interface of the terminal by obtaining an intersection set or a union set of the application configuration files corresponding to the M APPs in the first folder in the user interface of the terminal, wherein an operation option determined by obtaining the intersection set of the application configuration files corresponding to the M APPs in the first folder in the user interface of the terminal triggers an operation command to be concurrently executed on the M APPs in the first folder in the user interface of the terminal, and an operation option determined by obtaining the union set of the application configuration files corresponding to the M APPs in the first folder in the user interface of the terminal triggers an operation command to be executed on at least one APP of the M APPs in the first folder in the user interface of the terminal.

7. The method according to claim 1, wherein the method further comprises:
displaying, after obtaining the at least one operation option of the first folder in the user interface of the terminal, the at least one operation option of the first folder in the user interface of the terminal using a geometric shape or a menu bar.

8. The method according to claim 7, wherein displaying the at least one operation option of the first folder in the user interface of the terminal using the geometric shape or the menu bar comprises:
in response to the at least one operation option of the first folder in the user interface of the terminal being determined by obtaining the union set of the application configuration files corresponding to the M APPs in the first folder in the user interface of the terminal, prioritizing, according to a use frequency or a use permission, the at least one operation option of the first folder in the user interface of the terminal determined by obtaining the union set of the application configuration files corresponding to the M APPs in the first folder in the user interface of the terminal; and
displaying one or more first operation options of the first folder in the user interface of the terminal having a higher priority than one or more second operation options of the first folder in the user interface of the terminal using the geometric shape or the menu bar.

9. The method according to claim 7, wherein concurrently executing the operation command corresponding to the first operation option of the at least one operation option of the first folder in the user interface of the terminal on each APP of the M APPs in the first folder in the user interface of the terminal comprises performing, in response to the application configuration files corresponding to the M APPs in the first folder in the user interface of the terminal comprising information indicating that login using at least one social account is supported, and further in response to the M APPs in the first folder in the user interface of the terminal being in a logout state:
authorizing the M APPs in the first folder in the user interface of the terminal to be logged in to through a first social account in response to the first operation option of the at least one operation option of the first folder in the user interface of the terminal being an operation option determined by obtaining the intersection set according to the information indicating that login using the at least one social account is supported, wherein the first social account is a social account of the at least one social account.

10. The method according to claim 9, wherein concurrently executing the operation command corresponding to the first operation option of the at least one operation option of the first folder in the user interface of the terminal on each APP of the M APPs in the first folder in the user interface of the terminal comprises performing, in response to the application configuration files corresponding to the M APPs in the first folder in the user interface of the terminal comprising the information indicating that login using the at least one social account is supported, and further in response to the M APPs in the first folder in the user interface of the terminal being in a login state:
in response to the first operation option of the at least one operation option of the first folder in the user interface of the terminal being the operation option determined by obtaining the intersection set according to the information indicating that login using the at least one social account is supported, and the M APPs in the first folder in the user interface of the terminal comprising an APP that has been logged in to using a second social account different than a third social account, authorizing the APP that has been logged in to using the second social account to switch to login using the third social account, wherein the third social account is a social account of the at least one social account.

11. The method according to claim 9, wherein the information indicating that login using the at least one social account is supported is configured in a respective application configuration file of the application configuration files corresponding to the M APPs in the first folder in the user interface of the terminal when a respective APP of the M APPs in the first folder in the user interface of the terminal is installed on the terminal.

12. A method comprising:
determining, by a terminal having a display screen, in response to receiving a first operation on a first social application in a user interface of the terminal, M applications (APPs) supporting login using a first social account from APPs installed on the terminal, wherein M is an integer greater than 0, wherein the first social account is a login account corresponding to the first social application, and wherein the first operation on the first social application in the user interface of the terminal triggers an intersection set or a union set of application configuration files corresponding to the M APPs supporting login using the first social account to be obtained;
determining, by the terminal, a first operation option of the first social application in the user interface of the terminal to be triggered, wherein the first operation option of the first social application in the user interface of the terminal authorizes the M APPs supporting login using the first social account to be logged in to using the first social account; and
in response to the first operation option of the first social application in the user interface of the terminal being triggered, concurrently executing, by the terminal, an operation command corresponding to the first operation option of the first social application in the user interface of the terminal on each APP of the M APPs supporting login using the first social account.

13. The method according to claim 12, wherein the first operation on the first social application in the user interface of the terminal comprises touching and holding, force touching, or rotating on the display screen of the terminal, and wherein:
the touching and holding on the display screen of the terminal comprises pressing the display screen of the terminal for a pressing time within a first time range;
the force touching on the display screen of the terminal comprises pressing the display screen of the terminal with a pressing force magnitude within a first force magnitude range; and
the rotating on the display screen of the terminal comprises:
performing a clockwise rotation or performing a counterclockwise rotation on the display screen of the terminal; or
performing a rotation on the display screen of the terminal from a basis point at a rotation angle within a first angle range.

14. The method according to claim 12, wherein the application configuration files corresponding to the M APPs supporting login using the first social account comprise information indicating that login using the first social account is supported, and wherein determining the M APPs supporting login using the first social account from the APPs installed on the terminal comprises:
determining, according to the application configuration files of the APPs, the M APPs supporting login using the first social account from the APPs installed on the terminal; and
wherein determining the first operation option of the first social application in the user interface of the terminal to be triggered comprises determining an operation option corresponding to at least an APP of the M APPs logged in to using the first social account as the first operation option of the first social application in the user interface of the terminal to be triggered.

15. The method according to claim 14, wherein concurrently executing the operation command corresponding to the first operation option of the first social application in the user interface of the terminal on each APP of the M APPs supporting login using the first social account comprises performing, in response to the application configuration files corresponding to the M APPs supporting login using the first social account comprising information indicating that login using at least one social account is supported, and further in response to the M APPs supporting login using the first social account being in a logout state:
in response to the first operation option of the first social application in the user interface of the terminal being an operation option determined by obtaining a union set according to the information indicating that login using the at least one social account is supported, authorizing at least an APP of the M APPs to be logged in to using a second social account, wherein the second social account is a social account of the at least one social account.

16. The method according to claim 15, wherein concurrently executing the operation command corresponding to the first operation option of the first social application in the user interface of the terminal on each APP of the M APPs supporting login using the first social account comprises performing, in response to the application configuration files corresponding to the M APPs supporting login using the first social account comprising the information indicating that login using the at least one social account is supported, and further in response to the M APPs supporting login using the first social account being in a login state:
authorizing at least an APP of the M APPs that have been logged in to by using a social account other than a third social account to switch to login using the third social account in response to the first operation option of the first social application in the user interface of the terminal being the operation option determined by obtaining the union set according to the information indicating that login using the at least one social account is supported, and further in response to the M APPs comprising APPs that have been logged in to by using another social account other than the third social account, wherein the third social account is a social account of the at least one social account.

17. The method according to claim 15, wherein the information indicating that login using the at least one social account is supported is configured in a respective application configuration file of the application configuration files corresponding to the M APPs supporting login using the first social account when a respective APP of the M APPs supporting login using the first social account is installed on the terminal.

18. The method according to claim 12, wherein when the M APPs comprise an APP in a logout state, concurrently executing the operation command corresponding to the first operation option of the first social application in the user interface of the terminal on each APP of the M APPs supporting login using the first social account comprises:

authorizing the APP in the logout state to be logged in to using the first social account.

19. The method according to claim 12, wherein concurrently executing the operation command corresponding to the first operation option of the first social application in the user interface of the terminal on each APP of the M APPs supporting login using the first social account comprises performing, in response to the M APPs comprising an APP in a login state and is logged in using a second social account other than the first social account:

authorizing the APP in the login state and is logged in using the second social account to switch to login using the first social account.

20. A terminal, comprising:
a processor; and
a non-transitory computer-readable storage medium storing a program to be executed by the processor, the program including instructions configured to perform:
receiving a first operation on a first folder in a user interface of the terminal;
obtaining at least one operation option of the first folder in the user interface of the terminal, wherein the at least one operation option of the first folder in the user interface of the terminal is determined according to application configuration files of M applications (APPs) in the first folder in the user interface of the terminal, and M is an integer greater than 0, and wherein the first operation on the first folder in the user interface of the terminal triggers an intersection set or a union set of application configuration files corresponding to the M APPs in the first folder in the user interface of the terminal to be obtained; and
concurrently executing, in response to a first operation option of the at least one operation option of the first folder in the user interface of the terminal being triggered, an operation command corresponding to the first operation option of the at least one operation option of the first folder in the user interface of the terminal on each APP of the M APPs in the first folder in the user interface of the terminal.

* * * * *